United States Patent
Uebayashi et al.

(10) Patent No.: US 9,327,569 B2
(45) Date of Patent: May 3, 2016

(54) MOBILE VEHICLE

(71) Applicant: HONDA MOTOR CO., LTD., Tokyo (JP)

(72) Inventors: Yuichi Uebayashi, Saitama (JP); Taihei Setoguchi, Saitama (JP); Yasuhiko Jinbu, Saitama (JP); Hiroyoshi Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 14/560,121

(22) Filed: Dec. 4, 2014

(65) Prior Publication Data
US 2015/0158360 A1 Jun. 11, 2015

(30) Foreign Application Priority Data
Dec. 9, 2013 (JP) .................................. 2013-254539

(51) Int. Cl.
*B60G 3/26* (2006.01)
*B62K 5/027* (2013.01)
*B62K 5/10* (2013.01)

(52) U.S. Cl.
CPC . *B60G 3/26* (2013.01); *B62K 5/027* (2013.01); *B62K 5/10* (2013.01); *B60G 2300/122* (2013.01); *B60G 2300/45* (2013.01); *B60G 2800/012* (2013.01); *B62K 2204/00* (2013.01)

(58) Field of Classification Search
CPC ................ B60G 3/26; B60G 2800/12; B60G 2300/122; B60G 2300/45; B62K 5/027; B62K 5/10; B62K 2204/00
USPC .......................................... 701/38; 280/5.508
See application file for complete search history.

(56) References Cited

U.S. PATENT DOCUMENTS

| 6,139,120 A * | 10/2000 | Fukada ............... B60T 8/17554 180/197 |
| 2014/0129086 A1* | 5/2014 | Takenaka ............... B62D 6/003 701/41 |
| 2015/0158360 A1* | 6/2015 | Uebayashi ............... B60G 3/26 280/5.508 |
| 2015/0298691 A1* | 10/2015 | Kodaira ............... B62D 15/025 701/48 |

FOREIGN PATENT DOCUMENTS

| JP | 59-149878 A | 8/1984 |
| JP | 2005-088742 A | 4/2005 |
| JP | 2010-052728 A | 3/2010 |
| JP | 2010-221864 A | 7/2010 |

OTHER PUBLICATIONS

Japanese Office Action application No. JP2013-254539 dated Feb. 9, 2016.

* cited by examiner

*Primary Examiner* — Karen Beck
(74) *Attorney, Agent, or Firm* — Squire Patton Boggs (US) LLP

(57) ABSTRACT

A mobile vehicle 1 has two wheels 5, 5 on the rear side of a vehicle body 3, and is capable of causing a roll driving moment to act on the vehicle body 3 by an actuator 33 in a roll driving mechanism 23. A control device 70 controls the actuator 33 such that the function characteristics of the roll driving moment implemented by the control of the actuator 33 with respect to a vehicle body roll angle (inclination angle in the roll direction of the vehicle body 3) become as shown in FIG. 6A or 6B.

14 Claims, 10 Drawing Sheets

MOBILE VEHICLE

BACKGROUND OF THE INVENTION

1. Field of the Invention

The present invention relates to a mobile vehicle the turning behavior of which can be changed with inclination of the vehicle body.

2. Description of the Related Art

A mobile vehicle which has a seat section for an operator and two wheels at least as the front wheels or the rear wheels arranged on the right and left spaced apart from each other, and which allows the vehicle body to be inclined to the right or left (in the roll direction) by an actuator or by shifting of the operator's body weight, has been conventionally known.

For example, Japanese Patent Application Laid-Open No. S59-149878 (hereinafter, referred to as "Patent Literature 1") or Japanese Patent Application Laid-Open No. 2005-088742 (hereinafter, referred to as "Patent Literature 2") describes a three-wheeled mobile vehicle which has one wheel as a front wheel and two wheels (pair of right and left wheels) as rear wheels and which is configured to allow the vehicle body to be inclined to the right or left together with the front wheel.

Patent Literature 1 proposes a technique wherein, while the vehicle is stopped or traveling at low speeds, a torque (in the roll direction) according to the steering angle of the front wheel serving as the steered wheel is applied to the vehicle body by an actuator.

Patent Literature 2 proposes a technique wherein, under the vehicle speed conditions of 0 to 5 km/h (while the vehicle is stopped or traveling at low speeds), an angle of inclination (of the inclining vehicle body frame side with respect to the center surface) by the resultant force of gravitational force and centrifugal force is detected by an inclination sensor, and, on the basis of the detected value of the inclination angle, a torque in the roll direction is applied to the vehicle body frame side, by a torque application mechanism having an actuator, so as to make the inclination angle zero (or, such that the falling moment by the shift of center of gravity and the rising moment by the centrifugal force are balanced).

SUMMARY OF THE INVENTION

With the technique shown in Patent Literature 1 above, however, the front wheel (steered wheel) is steered so as to cause the torque in the roll direction to act on the inclinable vehicle body from the actuator. Therefore, in the case where the vehicle body is inclined while the vehicle is stopped, for example, in order to prevent further inclination of the vehicle body against the moment that acts on the vehicle body by the gravitational force, or in order to cancel the inclination of the vehicle body, the operator will have to intentionally steer the steered wheel; otherwise, the operator him/herself will have to support the vehicle body.

Further, when the vehicle body is inclined, if the operator erroneously steers the steered wheel in the direction opposite to the inclination (to the right or left) of the vehicle body, a torque further increasing the inclination of the vehicle body may act on the vehicle body from the actuator.

With the technique shown in Patent Literature 2 above, the torque application mechanism is configured to apply a torque to the vehicle body, while the vehicle is stopped or traveling at low speeds, such that the inclination of the vehicle body is constantly kept at the inclination where the moment because of the shift of center of gravity and the moment because of the centrifugal force are balanced. This is likely to restrain the effect by the operator of intentionally changing the inclination of the vehicle body by shifting his/her body weight.

The present invention has been accomplished in view of the foregoing, and it is an object of the present invention to provide a mobile vehicle which can appropriately control the angle of inclination either to the right or left of the vehicle body having a boarding section for an operator, and which allows the operator to readily change the inclination of the vehicle body by shifting his/her body weight.

In order to achieve the above object, the mobile vehicle according to the present invention is a mobile vehicle including a vehicle body having a boarding section for an operator and inclinable in a roll direction with respect to a road surface, two wheels disposed spaced apart from each other in a lateral direction on at least one of a front side and a rear side of the vehicle body, and a roll driving mechanism having an actuator and causing a roll driving moment as a road surface reaction force moment in the roll direction to act on the vehicle body in accordance with a driving force output by the actuator, the mobile vehicle having a characteristic that, while traveling, a turning behavior changes in accordance with a shift in the lateral direction of the body weight of the operator seated on the boarding section, and having a characteristic that, while being stopped, in the case where the vehicle body is inclined in the roll direction in the state where the roll driving moment acted on the vehicle body by the roll driving mechanism is zero, the inclination of the vehicle body further increases by a gravitational force moment which is a moment in the roll direction acting on the vehicle body because of gravitational force, the mobile vehicle including a control device which controls the actuator of the roll driving mechanism in such a way as to change the roll driving moment at least in accordance with an observed value of a vehicle body roll angle which is an inclination angle in the roll direction of the vehicle body, wherein the control device is configured to control the actuator of the roll driving mechanism such that, at least in a case where an actual vehicle speed of the mobile vehicle is higher than a first prescribed vehicle speed, function characteristics of the roll driving moment implemented by the control of the actuator of the roll driving mechanism by the control device with respect to the vehicle body roll angle have following properties A, B, and C (first invention).

Property A: a magnitude of roll driving moment sensitivity defined by the function characteristics can be classified as large and small, the magnitude of the roll driving moment sensitivity becomes small in a first vehicle body roll angle area which is one range of the vehicle body roll angle, and the magnitude of the roll driving moment sensitivity becomes large in a second vehicle body roll angle area which is a range of the vehicle body roll angle larger than an upper limit of the first vehicle body roll angle area and in a third vehicle body roll angle area which is a range of the vehicle body roll angle smaller than a lower limit of the first vehicle body roll angle area.

Property B: the roll driving moment in each of the second and third vehicle body roll angle areas is a moment in a direction of causing the observed value of the vehicle body roll angle to approach within the first vehicle body roll angle area.

Property C: the magnitude of the roll driving moment sensitivity in the first vehicle body roll angle area is smaller than a magnitude of gravitational force moment sensitivity, and the magnitude of the roll driving moment sensitivity in each of the second and third vehicle body roll angle areas is larger than the magnitude of the gravitational force moment sensitivity.

Here, in the present invention, the polarity of the vehicle body roll angle can be defined, for example, as follows: the vehicle body roll angle is zero in the state where the mobile vehicle is traveling straight ahead; the vehicle body roll angle is positive in the state where the vehicle body is inclined to one of the right and left sides; and the vehicle body roll angle is negative in the state where the vehicle body is inclined to the other of the right and left sides.

Further, the "roll driving moment sensitivity" in the present invention means the sensitivity of the change in the roll driving moment to the change in the vehicle body roll angle. The "gravitational force moment sensitivity" means the sensitivity of the change in the gravitational force moment to the change in the vehicle body roll angle.

Further, in the present specification, the "observed value" of an arbitrary state quantity related to the mobile vehicle (the aforesaid vehicle body roll angle or the like) means a detected value or an estimate of the actual value of the state quantity. In this case, the "detected value" means an actual value of the state quantity which is detected by an appropriate sensor. The "estimate" means a value which is estimated from a detected value of at least one state quantity having correlation with the state quantity, on the basis of the correlation, or it means a pseudo estimate (for example, a desired value) which can be considered to coincide with, or almost coincide with, the actual value of the state quantity.

According to the first invention described above, the function characteristics of the roll driving moment, implemented by the control of the actuator of the roll driving mechanism, with respect to the vehicle body roll angle have the aforesaid properties A, B, and C. Therefore, in the state where the observed value of the vehicle body roll angle falls within the first vehicle body roll angle area, the operator seated on the boarding section can readily change the actual vehicle body roll angle in a desired direction, by shifting the body weight to the right or left.

On the other hand, in the state where the observed value of the vehicle body roll angle falls outside the first vehicle body roll angle area (in other words, in the state where the observed value of the vehicle body roll angle falls within the second vehicle body roll angle area or the third vehicle body roll angle area), as the observed value of the vehicle body roll angle gets farther away from the first vehicle body roll angle area, the roll driving moment serving to cause the actual vehicle body roll angle to return to within the first vehicle body roll angle area is generated quickly.

This relatively firmly prevents the actual vehicle body roll angle from further deviating from the angle of inclination within the first vehicle body roll angle area (prevents the vehicle body from being further inclined to the right or left).

Therefore, according to the first invention, it is possible to appropriately control the angle of inclination of the vehicle body either to the right or left, and also facilitate the operator to change the inclination of the vehicle body by shifting his/her body weight.

Supplementally, in the first invention, the control device may be configured to control the actuator of the roll driving mechanism such that the function characteristics of the roll driving moment, implemented by the control of the actuator of the roll driving mechanism by the control device, with respect to the vehicle body roll angle have the aforesaid properties A, B, and C, irrespective of whether or not the actual vehicle speed of the mobile vehicle is higher than the first prescribed vehicle speed.

In the first invention, it is preferable that the control device is configured to control the actuator of the roll driving mechanism such that, at least in the case where the actual vehicle speed of the mobile vehicle is higher than the first prescribed vehicle speed, the function characteristics further have following property D (second invention).

Property D: the roll driving moment changes monotonically with respect to the vehicle body roll angle.

Here, in the second invention, the statement that the roll driving moment "changes monotonically" with respect to the vehicle body roll angle means that the roll driving moment increases monotonically, or decreases monotonically, with respect to the vehicle body roll angle.

More specifically, for example when the positive direction of the roll driving moment is defined to be the positive direction of the vehicle body roll angle, in the second invention, the statement that the roll driving moment "changes monotonically" with respect to the vehicle body roll angle means that the roll driving moment decreases monotonically with respect to the vehicle body roll angle. When the positive direction of the roll driving moment is defined to be the negative direction of the vehicle body roll angle, in the second embodiment, the statement that the roll driving moment "changes monotonically" with respect to the vehicle body roll angle means that the roll driving moment increases monotonically with respect to the vehicle body roll angle.

It should be noted that the monotonic decrease or increase described above means the monotonic decrease or increase in a broad sense. Therefore, in the second invention, the aforesaid function characteristics may be the characteristics that the roll driving moment within a partial range of the vehicle body roll angle (for example, in the aforesaid first vehicle body roll angle area) is maintained constant.

According to the second invention, it is possible to cause the roll driving moment implemented by the control of the actuator of the roll driving mechanism to change continuously with respect to the change of the vehicle body roll angle.

In the first or second invention described above, it is preferable that the control device is configured to control the actuator of the roll driving mechanism in accordance with an observed value of the vehicle body roll angle and an observed value of the vehicle speed such that a width of the first vehicle body roll angle area in the function characteristics becomes narrower as the vehicle speed of the mobile vehicle is lower (third invention).

According to the third invention, the width of the first vehicle body roll angle area becomes narrower as the vehicle speed of the mobile vehicle is lower. Accordingly, as the vehicle speed of the mobile vehicle is lower, the roll driving moment can be generated by the roll driving mechanism such that the vehicle body roll angle is more reliably maintained constant, or almost constant, without the need for the operator to intentionally keep the balance of the posture in the roll direction of the vehicle body.

The width of the first vehicle body roll angle area becomes wider as the vehicle speed of the mobile vehicle is higher. This facilitates the operator to change the vehicle body roll angle by intentionally shifting his/her body weight. It is therefore possible to improve the maneuverability during running of the mobile vehicle.

It should be noted that in the third invention, it is preferable that the control device is configured to control the actuator of the roll driving mechanism, in accordance with the observed value of the vehicle body roll angle and the observed value of the vehicle speed, such that the width of the first vehicle body roll angle area changes continuously with respect to the change of the vehicle speed of the mobile vehicle.

In the third invention described above, the first vehicle body roll angle area may have a width other than zero, not only in the case where the vehicle speed of the mobile vehicle is higher than the first prescribed vehicle speed, but also in the situation where the vehicle speed of the mobile vehicle is not higher than the first prescribed vehicle speed.

In the third invention, however, it is preferable that the control device is configured to control the actuator of the roll driving mechanism such that, in a state where the observed value of the vehicle speed of the mobile vehicle is not higher than the first prescribed vehicle speed, the upper limit and the lower limit of the first vehicle body roll angle area take an identical value, that the range of the vehicle body roll angle larger than the identical value and the range of the vehicle body roll angle smaller than the identical value become the second and third vehicle body roll angle areas, respectively, and that the function characteristics have the properties B and C related to the second and third vehicle body roll angle areas (fourth invention).

According to the fourth invention, in the state where the observed value of the vehicle speed of the mobile vehicle is not higher than the first prescribed vehicle speed, i.e. in the state where the mobile vehicle is stopped or traveling at a very low speed, the roll driving moment can be generated by the roll driving mechanism so as to firmly maintain the vehicle body roll angle constant.

Further, in the first through fourth inventions described above, it is preferable that the control device is configured to control the actuator of the roll driving mechanism in accordance with an observed value of the vehicle body roll angle and an observed value of a steering angle from a neutral state of a steered wheel included in the mobile vehicle such that, at least in the case where the actual vehicle speed of the mobile vehicle is higher than the first prescribed vehicle speed, the center value of the first vehicle body roll angle area becomes zero when the mobile vehicle is traveling straight ahead and, when the mobile vehicle is making a turn, a center value of the first vehicle body roll angle area becomes a value of the vehicle body roll angle in a state where the vehicle body is inclined to the same side as a turning direction of the mobile vehicle and the magnitude of the center value of the first vehicle body roll angle area becomes larger as a magnitude of the steering angle from the neutral state of the steered wheel is larger (fifth invention).

Alternatively, it is preferable that the control device is configured to control the actuator of the roll driving mechanism in accordance with an observed value of the vehicle body roll angle and an observed value of a yaw rate of the mobile vehicle such that, at least in the case where the actual vehicle speed of the mobile vehicle is higher than the first prescribed vehicle speed, a center value of the first vehicle body roll angle area becomes zero when the mobile vehicle is traveling straight ahead and, when the mobile vehicle is making a turn, the center value of the first vehicle body roll angle area becomes a value of the vehicle body roll angle in a state where the vehicle body is inclined to the same side as a turning direction of the mobile vehicle and a magnitude of the center value of the first vehicle body roll angle area becomes larger as a magnitude of the yaw rate of the mobile vehicle is larger (sixth invention).

Here, in the state where the mobile vehicle is making a turn, in order to resist the centrifugal force acting on the vehicle body and the operator, it is necessary to incline the vehicle body to the same side (right or left) as the turning direction.

It should be noted that in the fifth or sixth invention, the same side as the turning direction of the mobile vehicle means: the right side when the mobile vehicle is making a turn to the right (making a turn in the clockwise direction as seen from above), and the left side when the mobile vehicle is making a turn to the left (making a turn in the counterclockwise direction as seen from above).

According to the fifth or sixth invention, it becomes hard for the vehicle body to incline to the side opposite to the turning direction of the mobile vehicle and, at the same time, it is possible to appropriately restrict the angle by which the vehicle body inclines to the same side as the turning direction. Further, in the state where the actual vehicle body roll angle is within the first vehicle body roll angle area, the operator is readily possible to control the vehicle body roll angle to a desired angle by intentionally shifting the body weight. Consequently, the operator can intentionally change the turning behavior of the mobile vehicle.

In the fifth invention described above, it is preferable that the control device is configured to control the actuator of the roll driving mechanism such that, at least at the time when the mobile vehicle is making a turn in the state where the actual vehicle speed of the mobile vehicle is higher than the first prescribed vehicle speed, one of a limit value of the upper limit and the lower limit of the first vehicle body roll angle area that is on the same side as the turning direction of the mobile vehicle becomes a value closer to a reference vehicle body roll angle as compared with a limit value on a side opposite to the turning direction (seventh invention). The same applies to the sixth invention described above (eighth invention).

Here, the "reference vehicle body roll angle" means the value of the vehicle body roll angle at which the centrifugal force moment, which is the moment in the roll direction acting on the vehicle body because of the centrifugal force at the time when the mobile vehicle is making a turn, and the aforesaid gravitational force moment are balanced.

According to the seventh or eighth invention, at the time when the mobile vehicle is making a turn, if the inclination of the vehicle body to the same side as the turning direction is apt to increase further than the aforesaid reference vehicle body roll angle, the roll driving moment serving to prevent further inclination of the vehicle body can be generated quickly.

Accordingly, at the time when the mobile vehicle is making a turn, it is possible to suitably restrict the inclination of the vehicle body to the same side as the turning direction.

Further, in the first through eighth inventions described above, the control device may be configured to control the actuator of the roll driving mechanism such that the roll driving moment becomes zero, for example, in the state where the observed value of the vehicle body roll angle is within the first vehicle body roll angle area.

It is however preferable that the control device is configured to control the actuator of the roll driving mechanism in accordance with a deviation of an observed value of the vehicle body roll angle from reference vehicle body roll angle such that, at least in a case where the actual vehicle speed of the mobile vehicle is higher than a second prescribed vehicle speed, in a situation where the observed value of the vehicle body roll angle takes a value within the first vehicle body roll angle area, the observed value of the vehicle body roll angle approaches the reference vehicle body roll angle (ninth invention).

Here, the "reference vehicle body roll angle" in the ninth invention has the same meaning as the "reference vehicle body roll angle" in the seventh invention. Further, in the ninth invention, the reference vehicle body roll angle while the mobile vehicle is traveling straight ahead is defined to be zero.

According to the ninth invention, in the state where the actual vehicle body roll angle falls within the first vehicle body roll angle area, if the actual vehicle body roll angle is different from the reference vehicle body roll angle, the roll driving moment serving to make the actual vehicle body roll angle approach the reference vehicle body roll angle can be generated in a relatively small amount, while allowing the operator to incline the vehicle body by shifting his/her body weight.

Therefore, in this case, in the state where the actual vehicle body roll angle falls within the first vehicle body roll angle area, the actual vehicle body roll angle can readily be maintained at an inclination angle near the reference vehicle body roll angle.

In the ninth invention described above, the control device may be configured to control the actuator of the roll driving mechanism, in accordance with the deviation of the observed value of the vehicle body roll angle from the reference vehicle body roll angle, such that, in the situation where the observed value of the vehicle body roll angle takes a value within the first vehicle body roll angle area, the observed value of the vehicle body roll angle approaches the reference vehicle body roll angle, not only in the case where the actual vehicle speed of the mobile vehicle is higher than the second prescribed vehicle speed, but also in the case where the actual vehicle speed is not higher than the second prescribed vehicle speed.

It is however preferable that the control device is configured to set the reference vehicle body roll angle in accordance with an observed value of a steering angle from a neutral state of a steered wheel included in the mobile vehicle such that, in the case where the actual vehicle speed of the mobile vehicle is not higher than the second prescribed vehicle speed, the reference vehicle body roll angle becomes a value of the vehicle body roll angle to the same side as the steering angle of the steered wheel from the neutral state, and control the actuator of the roll driving mechanism in accordance with the deviation of the observed value of the vehicle body roll angle from the reference vehicle body roll angle in such a way as to cause the observed value of the vehicle body roll angle to approach the reference vehicle body roll angle (tenth invention).

It should be noted that in the tenth invention, the vehicle body roll angle to the same side as the steering angle of the steered wheel from the neutral state means the vehicle body roll angle in the state where the vehicle body is inclined to the same side as the turning direction of the mobile vehicle as the steered wheel is steered to the right or left from the neutral state.

According to the tenth invention, for example in the situation where the steered wheel has been steered from the neutral state before starting of the mobile vehicle for the purposes of making a turn immediately after the starting of the mobile vehicle, when the mobile vehicle is started, the vehicle body becomes likely to incline to the same side as the turning direction. It is thus possible to prevent the vehicle body from inclining to the side opposite to the turning direction immediately after the mobile vehicle is started.

In the first through eighth inventions described above, more specifically, the control device can adopt, for example, the following configuration.

For example, the control device includes a vehicle body roll angle area setting section which sets the first vehicle body roll angle area, a vehicle body roll angle deviation state quantity calculating section which calculates a deviation state quantity indicating a deviation state of the observed value of the vehicle body roll angle from the set first vehicle body roll angle area, and a first manipulated variable determining section which determines a first manipulated variable, which is a manipulated variable for controlling the actuator of the roll driving mechanism to generate the roll driving moment for reducing the deviation of the observed value of the vehicle body roll angle, in accordance with the calculated deviation state quantity, or in accordance with the calculated deviation state quantity and an observed value of a vehicle body roll angular velocity, which is a temporal change rate of the vehicle body roll angle, and the control device is configured to control the actuator of the roll driving mechanism at least in accordance with the determined first manipulated variable (eleventh invention).

It should be noted that the deviation state described above includes: the presence/absence of the deviation of the observed value of the vehicle body roll angle from the first vehicle body roll angle area, the degree of the deviation, the direction of the deviation, and other states.

According to the eleventh invention, the control device determines the first manipulated variable in accordance with the calculated deviation state quantity, or in accordance with the calculated deviation state quantity and the observed value of the vehicle body roll angular velocity, and controls the actuator of the roll driving mechanism in accordance with the first manipulated variable.

Accordingly, at least in the case where the observed value of the vehicle body roll angle has deviated from the first vehicle body roll angle area, the roll driving moment serving to make the observed value of the vehicle body roll angle return to within the first vehicle body roll angle area can be generated appropriately by feedback control.

Further, in the case where the first manipulated variable is determined in accordance with the calculated deviation state quantity and the observed value of the vehicle body roll angular velocity, it is possible to quickly brake or restrain the change of the actual vehicle body roll angle when the observed value of the vehicle body roll angle has deviated from the first vehicle body roll angle area or the like.

Further, in the ninth or tenth invention, more specifically, the control device can adopt, for example, the following configuration.

For example, the control device includes a vehicle body roll angle area setting section which sets the first vehicle body roll angle area, a vehicle body roll angle deviation state quantity calculating section which calculates a deviation state quantity indicating a deviation state of the observed value of the vehicle body roll angle from the set first vehicle body roll angle area, a first manipulated variable determining section which determines a first manipulated variable, which is a manipulated variable for controlling the actuator of the roll driving mechanism to generate the roll driving moment for reducing the deviation of the observed value of the vehicle body roll angle, in accordance with the calculated deviation state quantity, or in accordance with the calculated deviation state quantity and an observed value of a vehicle body roll angular velocity, which is a temporal change rate of the vehicle body roll angle, a reference vehicle body roll angle setting section which sets the reference vehicle body roll angle, and a second manipulated variable determining section which determines a second manipulated variable, which is a manipulated variable for controlling the actuator of the roll driving mechanism to generate the roll driving moment for causing the deviation of the observed value of the vehicle body roll angle from the set reference vehicle body roll angle to approach zero, at least in accordance with the deviation, and the control device is configured to control the actuator of the roll driving mechanism at least in accordance with a combined value of the determined first and second manipulated variables (twelfth invention).

It should be noted that the deviation state described above includes, as with the "deviation state" in the eleventh invention: the presence/absence of the deviation of the observed value of the vehicle body roll angle from the first vehicle body roll angle area, the degree of the deviation, the direction of the deviation, and other states.

According to the twelfth invention, the control device determines the first manipulated variable in accordance with the calculated deviation state quantity, or in accordance with the calculated deviation state quantity and the observed value of the vehicle body roll angular velocity, and also determines the second manipulated variable in accordance with the deviation of the observed value of the vehicle body roll angle from the set reference vehicle body roll angle, and controls the actuator of the roll driving mechanism in accordance with the combined value of the first manipulated variable and the second manipulated variable.

In this manner, at least in the case where the observed value of the vehicle body roll angle has deviated from the first vehicle body roll angle area, the roll driving moment serving to make the observed value of the vehicle body roll angle return to within the first vehicle body roll angle area can be generated appropriately by feedback control.

Further, in the case where the observed value of the vehicle body roll angle falls within the first vehicle body roll angle area, the roll driving moment serving to make the observed value of the vehicle body roll angle approach the reference vehicle body roll angle (to make the aforesaid deviation approach zero) can be generated appropriately by feedback control.

Further, in the eleventh invention described above, it is preferable that the first manipulated variable determining section is configured to determine the first manipulated variable in accordance with the calculated deviation state quantity and an observed value of the vehicle body roll angular velocity, and, in a case where the observed value of the vehicle body roll angle falls within the set first vehicle body roll angle area and takes a value close to an upper limit or a lower limit of the first vehicle body roll angle area, determine the first manipulated variable in accordance with the observed value of the vehicle body roll angular velocity in such a way as to cause the vehicle body roll angular velocity to approach zero (thirteenth invention). The same applies to the twelfth invention described above (fourteenth invention).

According to the thirteenth or fourteenth invention, in the situation where the observed value of the vehicle body roll angle is apt to deviate on the upper limit side or the lower limit side from within the first vehicle body roll angle area, the roll driving moment for braking the change in the vehicle body roll angle can be generated.

Therefore, in the case where the actual vehicle body roll angle is apt to deviate from the first vehicle body roll angle area, the deviation can be prevented in advance.

DESCRIPTION OF THE PREFERRED EMBODIMENTS

First Embodiment

A first embodiment of the present invention will be described below with reference to FIGS. 1 to 7.

First, the structure of the mobile vehicle of the present embodiment will be described with reference to FIGS. 1 and 2.

Figure 1:
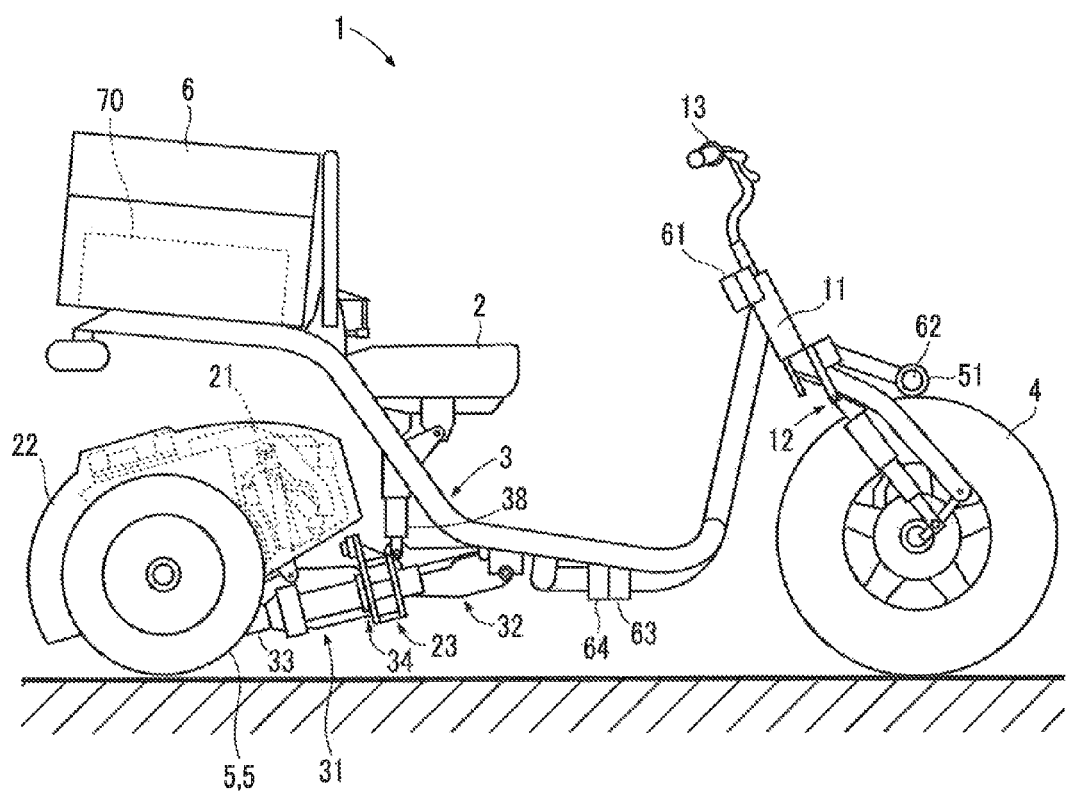
FIG. 1 shows the structure of a mobile vehicle according to an embodiment of the present invention.
Figure 2:
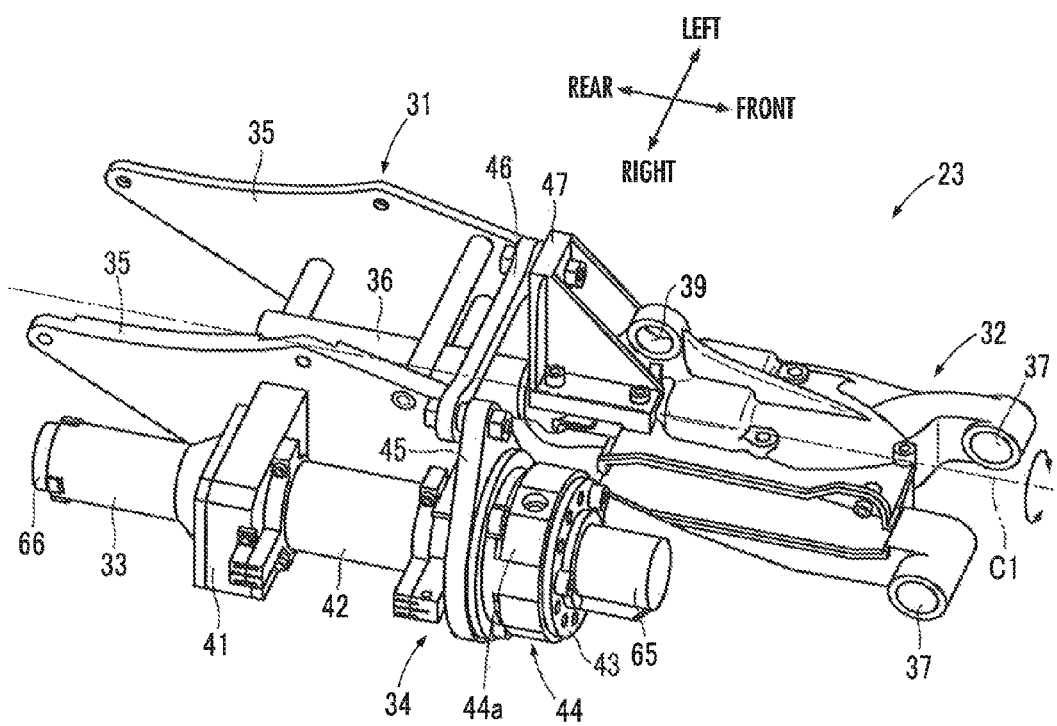
FIG. 2 is a perspective view showing the configuration of a roll driving mechanism included in the mobile vehicle shown in FIG. 1.

As shown in FIG. 1, the mobile vehicle 1 of the present embodiment is a three-wheeled vehicle which includes: a vehicle body 3 of a frame structure having a boarding section 2 for an operator; one wheel 4 (hereinafter, referred to as "front wheel 4") arranged as a front wheel on the front side of the vehicle body 3; and two wheels 5, 5 (hereinafter, referred to as "rear wheels 5, 5") arranged as rear wheels on the rear side of the vehicle body 3.

The two rear wheels 5, 5 are arranged spaced apart from each other in the lateral direction of the vehicle body 3 (perpendicular to the paper plane of FIG. 1).

In the mobile vehicle 1 of the present embodiment, the front wheel 4 is a steered wheel, and the rear wheels 5, 5 are driving wheels.

It should be noted that FIG. 1 is a side view of the mobile vehicle 1 in the state where the axle centerline (center of rotational axis) of the front wheel 4 and the axle centerline (center of rotational axis) of the rear wheels 5, 5 are parallel to each other and the front wheel 4 and the rear wheels 5, 5 are standing in an upright posture on the road surface (in other words, the mobile vehicle 1 in the posture state when traveling straight ahead; hereinafter, this will be referred to as "basic posture state"). Therefore, in FIG. 1, of the two rear wheels 5, 5, the left wheel 5 is hidden behind the right wheel 5.

The boarding section 2, which is configured as a seat for an operator to sit on, is assembled to an intermediate portion of the vehicle body 3 between its front end and rear end. The operator seated on the boarding section 2 can place the right and left feet on the vehicle body 3 (or a step assembled to the vehicle body 3) at a portion between the boarding section 2 and the front end of the vehicle body 3.

On the rear end of the vehicle body 3, a box-shaped luggage loading section 6 for loading a variety of luggage is provided. The luggage loading section 6 may be an exposed luggage rack. The luggage loading section 6 may not be provided.

On the front end of the vehicle body 3, a head pipe 11 is formed which has an oblique shaft center as a steering axis of the front wheel 4. The head pipe 11 is arranged above the rear side of the front wheel 4. A front-wheel support mechanism 12 for supporting the front wheel 4 rotatably about its axle centerline is assembled to the head pipe 11.

The front-wheel support mechanism 12, which is configured, for example, as a front fork mechanism including a suspension mechanism such as a damper, is assembled to the head pipe 11 in such a way as to be rotatable about the shaft center of the head pipe 11 (about the steering axis) together with the front wheel 4. As the front-wheel support mechanism 12 rotates together with the front wheel 4 about the shaft center of the head pipe 11 (about the steering axis), the steering of the front wheel 4 is carried out. Accordingly, the front wheel 4 is attached to the vehicle body 3 so as to be steerable via the front-wheel support mechanism 12.

It should be noted that, for the specific structure of the front-wheel support mechanism 12, the same structure as that of a typical front-wheel support mechanism of a normal motorcycle, for example, may be adopted.

On the upper side of the head pipe 11, a handlebar 13 for an operator to grip is disposed. The handlebar 13 is assembled to the head pipe 11 in such a way as to be rotatable about the steering axis unitarily with the front-wheel support mechanism 12.

Although not shown in detail in the figure, the handlebar 13 is equipped with an accelerator grip, a brake lever, a turn signal lamp, and so on.

A rotation transmission mechanism such as a speed reducer may be interposed between the front-wheel support mechanism 12 and the handlebar 13 such that the ratio of the rotational angle of the front-wheel support mechanism 12 to the rotational angle of the handlebar 13 takes a value other than 1.

The right and left rear wheels 5, 5 are disposed beneath the rear-end portion of the vehicle body 3. At the position between the rear wheels 5, 5, a power engine unit 21 serving as a power source of the mobile vehicle 1 is disposed. The power engine unit 21 is provided with a cover member 22 which covers the upper side of the power engine unit 21.

Although not shown in detail in the figure, the power engine unit 21 is connected to the rear wheels 5, 5 such that a rotative driving force about the axle centerline of the rear wheels 5, 5 is transmitted from a power engine, which is configured with an engine, an electric motor or the like, to the rear wheels 5, 5 serving as the driving wheels.

For the specific connection structure between the power engine unit 21 and the rear wheels 5, 5, for example, the structure described in the aforesaid Patent Literature 2, or other known structure may be adopted.

The power engine unit 21 is coupled to the vehicle body 3 via a roll driving mechanism 23. Therefore, the rear wheels 5, 5 are attached to the vehicle body 3 via the power engine unit 21, serving as a rear-wheel support mechanism which rotatably supports the rear wheels 5, 5, and the roll driving mechanism 23.

The roll driving mechanism 23 is a mechanism which couples the power engine unit 21 to the vehicle body 3 in such a way as to allow the vehicle body 3 to freely incline in the roll direction (the direction about the roll axis which is an axis in the longitudinal direction of the vehicle body 3) with respect to the road surface, and which also causes a road surface reaction force moment in the roll direction to act on the vehicle body 3 by the driving force of an actuator.

In the present embodiment, this roll driving mechanism 23 is configured as follows. Referring to FIG. 2, the roll driving mechanism 23 includes, as its major components: a rear-wheel-side fixing unit 31 which is secured to the power engine unit 21, a rotary unit 32 which is assembled in such a way as to be rotatable in the roll direction with respect to the rear-wheel-side fixing unit 31, an electric motor 33 serving as the actuator, and a power transmission mechanism 34 which transmits the driving force (rotative driving force) output from the electric motor 33 to the rotary unit 32.

The rear-wheel-side fixing unit 31 includes a pair of plate members 35, 35 which are spaced apart from each other in the lateral direction and secured to the power engine unit 21 via screws and the like, and a shaft member 36 which is disposed between the plate members 35, 35 in the state where its shaft center C1 extends in the longitudinal direction. The shaft member 36 has its outer periphery secured to the plate members 35, 35.

The rotary unit 32 disposed on the front-end side of the shaft member 36 is coupled to the shaft member 36 via a bearing or the like in such a way as to be rotatable about the shaft center C1 of the shaft member 36.

The rotary unit 32 extends frontward from the shaft member 36 side, and the tip-end portion of the rotary unit 32 is bifurcated to have a spacing in the lateral direction. Further, at the respective ends of the bifurcated portions, mounting holes 37, 37 for coupling the rotary unit 32 to the vehicle body 3 are formed so as to have a lateral shaft center. The rotary unit 32 is attached via the mounting holes 37, 37 to the vehicle body 3 (more specifically, to the intermediate portion in the longitudinal direction of the vehicle body 3) in such a way as to be swingable in the pitch direction about the shaft center of the mounting holes 37, 37 with respect to the vehicle body 3 (see FIG. 1).

Therefore, the vehicle body 3 is able to incline in the roll direction about the shaft center C1 of the shaft member 36 with respect to the rear wheels 5, 5 (and hence, with respect to the road surface with which the rear wheels 5, 5 are in contact), and also is able to swing in the pitch direction about the shaft center of the mounting holes 37, 37.

Further, on the upper surface portion of the rotary unit 32, a mounting hole 39 for coupling a damper 38 shown in FIG. 1 is formed so as to have a lateral shaft center. As shown in FIG. 1, the damper 38 has its lower end portion pivotally supported by the rotary unit 32 via the mounting hole 39 and its upper end portion pivotally supported by the vehicle body 3. With this configuration, the damper 38 serves to damp or brake the swing in the pitch direction of the vehicle body 3 with respect to the rear wheels 5, 5.

The electric motor 33 is disposed on a side of one of the plate members 35, 35, for example on the side of the right plate member 35, with its shaft center (center of rotational axis of the rotor) in the same direction as the shaft center C1 of the shaft member 36. The housing of the electric motor 33 is secured to the right plate member 35 via the housing of a speed reducer 41 mounted to the output-side end of the electric motor 33.

The power transmission mechanism 34 has the speed reducer 41, and also has a coupling 44, a driving-side crank arm 45, a connection rod 46, and a driven-side crank arm 47. The power transmission mechanism 34 is configured to transmit the rotative driving force input from the electric motor 33 to the speed reducer 41, to the rotary unit 32, via the coupling 44, the driving-side crank arm 45, the connection rod 46, and the driven-side crank arm 47.

More specifically, a ring-shaped plate 43 serving as an input section of the coupling 44 is secured to a tip end portion of an output shaft 42 protruding frontward from the speed reducer 41. Further, the plate-shaped driving-side crank arm 45 serving as an output section of the coupling 44 is disposed behind the ring-shaped plate 43, spaced apart from the ring-shaped plate 43 in the shaft center direction of the output shaft 42. The driving-side crank arm 45 is supported on the outer periphery of the output shaft 42 via a bearing or the like in such a way as to be rotatable relative to the output shaft 42.

The coupling 44 is interposed between the ring-shaped plate 43 and the driving-side crank arm 45. The coupling 44 has a structure in which projections and depressions formed on the respective surfaces of the driving-side crank arm 45 and the ring-shaped plate 43 facing each other are engaged via a plurality of elastic members 44a of rubber or the like. Therefore, the coupling 44 is configured to transmit the rotative driving force between the ring-shaped plate 43 and the driving-side crank arm 45 via the elastic force of the elastic members 44a.

The driven-side crank arm 47 is protrusively provided on the upper surface portion of the rotary unit 32 such that it is aligned with the driving-side crank arm 45, with a spacing therebetween in the lateral direction. The driven-side crank arm 47 is coupled to the driving-side crank arm 45 via the connection rod 46.

In this case, the end of the connection rod 46 on the driving-side crank arm 45 side is pivotally supported by the driving-side crank arm 45 so as to be rotatable about the shaft center which is eccentric to the shaft center of the output shaft 42. Further, the end of the connection rod 46 on the driven-side crank arm 47 side is pivotally supported by the driven-side crank arm 47 so as to be rotatable about the shaft center which is eccentric to the shaft center C1 of the shaft member 36.

With the power transmission mechanism 34 configured as described above, the rotative driving force output from the electric motor 33 via the speed reducer 41 to the output shaft 42 is transmitted via the ring-shaped plate 43, the coupling 44, the driving-side crank arm 45, the connection rod 46, and the driven-side crank arm 47, to the rotary unit 32. The power transmission mechanism 34 then transmits the rotative driving force that has been transmitted to the rotary unit 32, via the rotary unit 32 to the vehicle body 3.

In this case, the housing of the electric motor 33 (a stator of the electric motor 33 is secured to this housing) is secured via the rear-wheel-side fixing unit 31 to the power engine unit 21 to which the rear wheels 5, 5 are connected. Therefore, transmitting the rotative driving force from the electric motor 33 to the vehicle body 3 causes a road surface reaction force moment in the roll direction to act on the vehicle body 3.

Supplementally, as the actuator of the roll driving mechanism 23, instead of the electric motor 33 which outputs the rotative driving force, a hydraulic rotary actuator may be used. Alternatively, an electric or hydraulic linear actuator may be used instead of the electric motor 33.

Further, the roll driving mechanism 23 may be configured to be able to apply the rotative driving force in the roll direction to the vehicle body 3 by a configuration other than that described above. For example, as the power transmission mechanism 34, a mechanism which includes a plurality of gears or a mechanism which transmits rotation via a belt or chain may be adopted.

In addition to the mechanical configuration described above, the mobile vehicle 1 includes the following configuration as the configuration for controlling the posture (inclination) in the roll direction of the vehicle body 3 and for controlling the operation of the electric motor 33.

Figure 3:
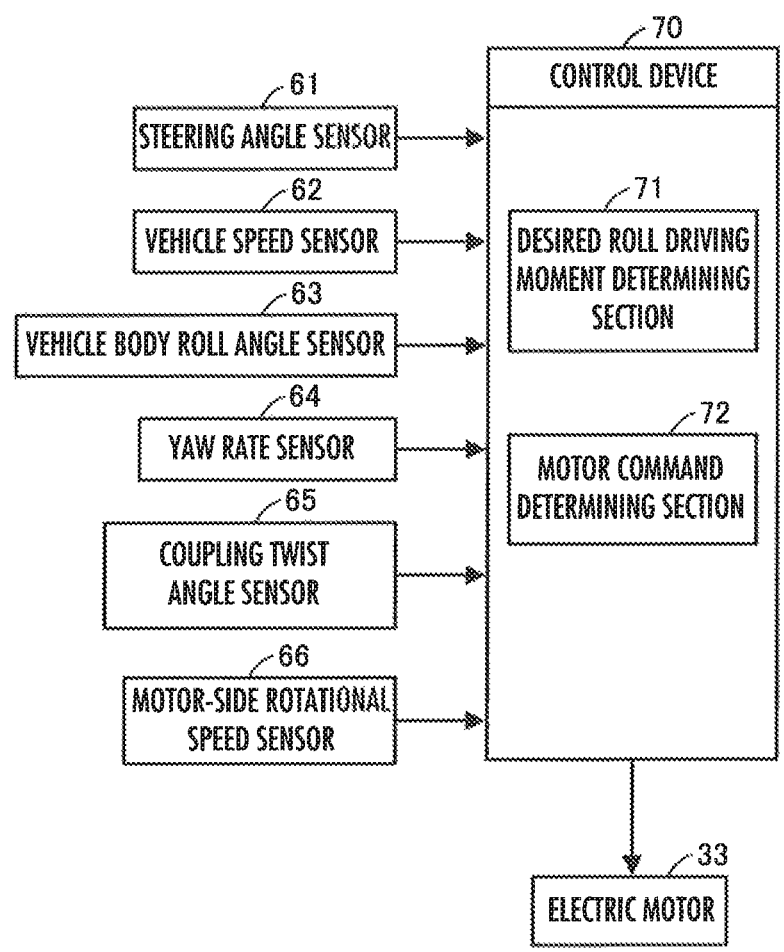
FIG. 3 is a block diagram showing the configuration related to the control of the mobile vehicle shown in FIG. 1.

The mobile vehicle 1 includes, as sensors for observing (detecting or estimating) the motional states of the mobile vehicle 1, as shown in FIG. 3: a steering angle sensor 61 for observing the steering angle of the front wheel 4; a vehicle speed sensor 62 for observing the vehicle speed of the mobile vehicle 1; a vehicle body roll angle sensor 63 for observing the vehicle body roll angle which is the inclination angle in the roll direction (inclination angle with respect to the gravitational force direction) of the vehicle body 3; and a yaw rate sensor 64 for observing the yaw rate of the vehicle body 3.

The mobile vehicle 1 further includes a coupling twist angle sensor 65 for observing the relative rotational angle (hereinafter, referred to as "coupling twist angle") between the ring-shaped plate 43 on the input side and the driving-side crank arm 45 on the output side of the coupling 44; and a motor-side rotational speed sensor 66 for observing the rotational speed of the rotor of the electric motor 33 (or the rotational speed of the aforesaid output shaft 42).

Furthermore, the mobile vehicle 1 includes a control device 70 which performs posture control in the roll direction of the vehicle body 3 by controlling the electric motor 33. The output signals from the above-described sensors 61 to 66 are input to this control device 70. The control device 70 is made up of an electronic circuit unit including a CPU, a RAM, a ROM, and so on. The control device 70 has the function of recognizing and acquiring, from the output signals of the sensors 61 to 66, observed values of the corresponding state quantities (steering angle, vehicle speed, etc.). The function is implemented, for example, by an A/D converter, processor, and the like.

The steering angle sensor 61 is made up, for example, of a rotary encoder, a potentiometer, or the like. The steering angle sensor 61 is assembled to the head pipe 11 on the front end of the vehicle body 3, as shown in FIG. 1, such that it outputs a signal corresponding to the steering angle of the front wheel 4 (rotational angle of the front-wheel support mechanism 12 or the handlebar 13).

It should be noted that in the following description, the value and polarity of the steering angle recognized from the output signal of the steering angle sensor 61 are defined as follows: the steering angle (neutral steering angle) of the front wheel 4 in the aforesaid basic posture state of the mobile vehicle 1 (posture state when it is traveling straight ahead) is zero; the steering angle when the front wheel 4 is steered from the neutral steering angle to the right (clockwise direction as seen from above) is a positive steering angle; and the steering angle when the front wheel 4 is steered from the neutral steering angle to the left (counterclockwise direction as seen from above) is a negative steering angle.

The vehicle speed sensor 62 is made up, for example, of a rotary encoder. The vehicle speed sensor 62 is mounted to the mobile vehicle 1, as shown in FIG. 1, such that it outputs a signal corresponding to the rotational speed of the front wheel 4. In the example of the present embodiment, a roller 51 which is in contact with the upper surface of the front wheel 4 so as to rotate in conjunction with the rotation of the front wheel 4 is attached to the front-wheel support mechanism 12. The vehicle speed sensor 62 is attached to a rotary shaft portion of the roller 51 such that it outputs a signal corresponding to the rotational speed of the roller 51 (which is proportional to the rotational speed of the front wheel 4).

In this case, the control device 70 acquires an observed value of the vehicle speed by converting the rotational speed of the roller 51, indicated by the signal from the vehicle speed sensor 62, to the vehicle speed, by a predetermined arithmetic expression or map.

It should be noted that the rotary encoder constituting the vehicle speed sensor 62 may be attached to the axle of the front wheel 4, for example. Alternatively, the rotary encoder may be mounted to the mobile vehicle 1 such that it outputs a detection signal corresponding to the rotational speed of the rear wheel 5, for example. Still alternatively, the vehicle speed sensor 62 may be configured with a sensor other than the rotary encoder.

The vehicle body roll angle sensor 63 is made up, for example, of an acceleration sensor and a gyro sensor (angular velocity sensor). The vehicle body roll angle sensor 63 is assembled to the underside of the vehicle body 3 between the front wheel 4 and the rear wheels 5, 5, as shown in FIG. 1. In this case, the control device 70 carries out prescribed arithmetic processing on the basis of the outputs of the acceleration sensor and the gyro sensor to obtain an observed value of the vehicle body roll angle. For the specific arithmetic processing in this case, the technique proposed by the present applicant in Japanese Patent No. 4181113, or the known strap down technique, for example, may be adopted.

It should be noted that in the following description, the value and polarity of the vehicle body roll angle recognized from the output signal of the vehicle body roll angle sensor 63 are defined as follows: the vehicle body roll angle in the aforesaid basic posture state of the mobile vehicle 1 (posture state when it is traveling straight ahead) is zero; the vehicle body roll angle when the vehicle body 3 is inclined to the right from the basic posture state (as the mobile vehicle 1 is seen from the back) is a positive vehicle body roll angle; and the vehicle body roll angle when the vehicle body 3 is inclined to the left from the basic posture state (as the mobile vehicle 1 is seen from the back) is a negative vehicle body roll angle.

Supplementally, in the present embodiment, the vehicle body roll angle sensor 63 is also utilized as a sensor for detecting a vehicle body roll angular velocity, which is a temporal change rate of the vehicle body roll angle. An observed value of the vehicle body roll angular velocity can be obtained through arithmetic processing of calculating the observed value of the vehicle body roll angular velocity from the output of the vehicle body roll angle sensor 63, or through processing (differential operation processing) of calculating the temporal change rate of the observed value of the vehicle body roll angle.

The yaw rate sensor 64 is made up of a gyro sensor or the like. The yaw rate sensor 64 is assembled to the underside of the vehicle body 3 between the front wheel 4 and the rear wheels 5, 5, as shown in FIG. 1. In the case where the vehicle body roll angle sensor 63 includes, as its constituent element, a gyro sensor which generates and outputs a signal corresponding to the angular velocity in the yaw direction, the yaw rate sensor 64 may be omitted. The control device 70 may obtain an observed value of the yaw rate from the output signal of the vehicle body roll angle sensor 63.

It should be noted that in the following description, the polarity of the yaw rate recognized from the output signal of the yaw rate sensor 64 is defined as follows: the yaw rate generated when the mobile vehicle 1 is making a turn to the right (making a turn in the clockwise direction as seen from above) is a positive yaw rate; and the yaw rate generated when the mobile vehicle 1 is making a turn to the left (making a turn in the counterclockwise direction as seen from above) is a negative yaw rate.

The coupling twist angle sensor 65 is made up, for example, of a rotary encoder, a potentiometer or the like. The coupling twist angle sensor 65 is attached to the ring-shaped plate 43, on its side opposite to the coupling 44 side, of the power transmission mechanism 34 in the roll driving mechanism 23, as shown in FIG. 2, such that it outputs a signal corresponding to the coupling twist angle.

It should be noted that the coupling twist angle sensor 65 may be configured, for example, with: a sensor which outputs a signal corresponding to the angle of rotation of the output shaft 42 or the ring-shaped plate 43, and a sensor which outputs a signal corresponding to the angle of rotation of the driving-side crank arm 45.

The motor-side rotational speed sensor 66 is made up, for example, of a rotary encoder or the like. The motor-side rotational speed sensor 66 is attached to the electric motor 33, as shown in FIG. 2, such that it outputs a signal corresponding to the rotational speed of the rotor of the electric motor 33 (which is proportional to the rotational speed of the output shaft 42).

The control device 70 is mounted on the mobile vehicle 1 in an appropriate position. For example, as shown in FIG. 1, the control device 70 is mounted on the aforesaid luggage loading section 6. This control device 70 includes, as functions implemented by installed programs, or as functions implemented by hardware configurations, in addition to the function of acquiring the observed values of the state quantities such as the steering angle and the like: a desired roll driving moment determining section 71 which successively determines a desired roll driving moment, which is a desired value of a road surface reaction force moment in the roll direction to be acted on the vehicle body 3, and a motor command determining section 72 which successively determines a motor command, which is a control command for the electric motor 33, in accordance with the desired roll driving moment. The motor command is, for example, a torque command value (a desired value of the output torque) of the electric motor 33.

Although not shown in the figure, a battery as a power source for the control device 70, the electric motor 33 and the like is also mounted on the mobile vehicle 1.

Operations of the mobile vehicle 1 of the present embodiment will now be described, focusing on the control processing performed by the control device 70.

In the following description, of the reference characters indicating various state quantities such as a vehicle body roll angle and the like, the reference characters having a suffix "_act" added thereto represent an actual value or its observed value (detected value or estimate) of the corresponding state quantity. The reference characters having a suffix "_cmd" added thereto represent a desired value of the corresponding state quantity.

When a starter switch (not shown) of the mobile vehicle 1 is turned on, the power engine unit 21 and the control device 70 are started.

In this starting state, when the operator seated on the boarding section 2 operates the accelerator grip of the handlebar 13, the rear wheels 5, 5 are rotatively driven by the power engine unit 21. This causes the mobile vehicle 1 to run.

Further, the control device 70 thus started carries out the processing in the desired roll driving moment determining section 71, while acquiring the outputs from the aforesaid sensors 61 to 66, to successively determine a desired roll driving moment at prescribed control processing cycles. The control device 70 further carries out the processing in the motor command determining section 72, in accordance with the desired roll driving moment, to successively determine a motor command at the prescribed control processing cycles.

The control device 70 then performs feedback control of the electric current flowing through the electric motor 33, via a motor driving circuit (not shown), in accordance with the motor command, so as to make the output torque of the electric motor 33 track a torque command value indicated by the motor command. In this manner, the road surface reaction force moment in the roll direction that actually acts on the vehicle body 3 is controlled to track the desired roll driving moment.

The processing in the desired roll driving moment determining section 71 and that in the motor command determining section 72 in the control device 70 are carried out in the following manner.

First, the processing in the desired roll driving moment determining section 71 will be described. The processing in the desired roll driving moment determining section 71 can be summarized as follows. In the situation where the actual vehicle body roll angle has deviated from an appropriate range, or in the situation where such a deviation is liable to occur, the desired roll driving moment determining section 71 determines a desired roll driving moment Md_cmd so as to prevent the deviation (more specifically, such that the actual vehicle body roll angle returns to within the appropriate range, or such that the vehicle body roll angle remains within the appropriate range).

The appropriate range described above is an angle range in the vicinity of (or, not too far from) a vehicle body roll angle (hereinafter, referred to as "reference vehicle body roll angle") at which it is possible to implement the behavioral characteristics considered to be ideal (optimal) for the mobile vehicle 1 or the behavioral characteristics as a design goal. In the present embodiment, for example, the reference vehicle body roll angle corresponds to, or is close to, a vehicle body roll angle at which the gravitational force moment and the centrifugal force moment are balanced with each other and their resultant moment becomes zero.

Here, the gravitational force moment is, more specifically, the moment in the roll direction that acts on the vehicle body 3 because of the gravitational force acting on the overall center of gravity of the mobile vehicle 1 and the operator riding thereon. The centrifugal force moment is, more specifically, the moment in the roll direction that acts on the vehicle body 3, while the mobile vehicle 1 is making a turn, because of the centrifugal force acting on the overall center of gravity of the mobile vehicle 1 and the operator riding thereon.

Supplementally, when the mobile vehicle 1 is traveling straight ahead, the centrifugal force moment is zero, and thus, the resultant moment described above coincides with the gravitational force moment.

Further, in the situation where the actual vehicle body roll angle falls within the above-described appropriate range, the desired roll driving moment determining section 71 determines the desired roll driving moment so as not to restrain the inclination in the roll direction of the vehicle body 3 by the shift of the body weight of the operator (shift to the right or left of the overall center of gravity of the mobile vehicle 1 and the operator), or such that the restraint will be sufficiently small.

Figure 4:
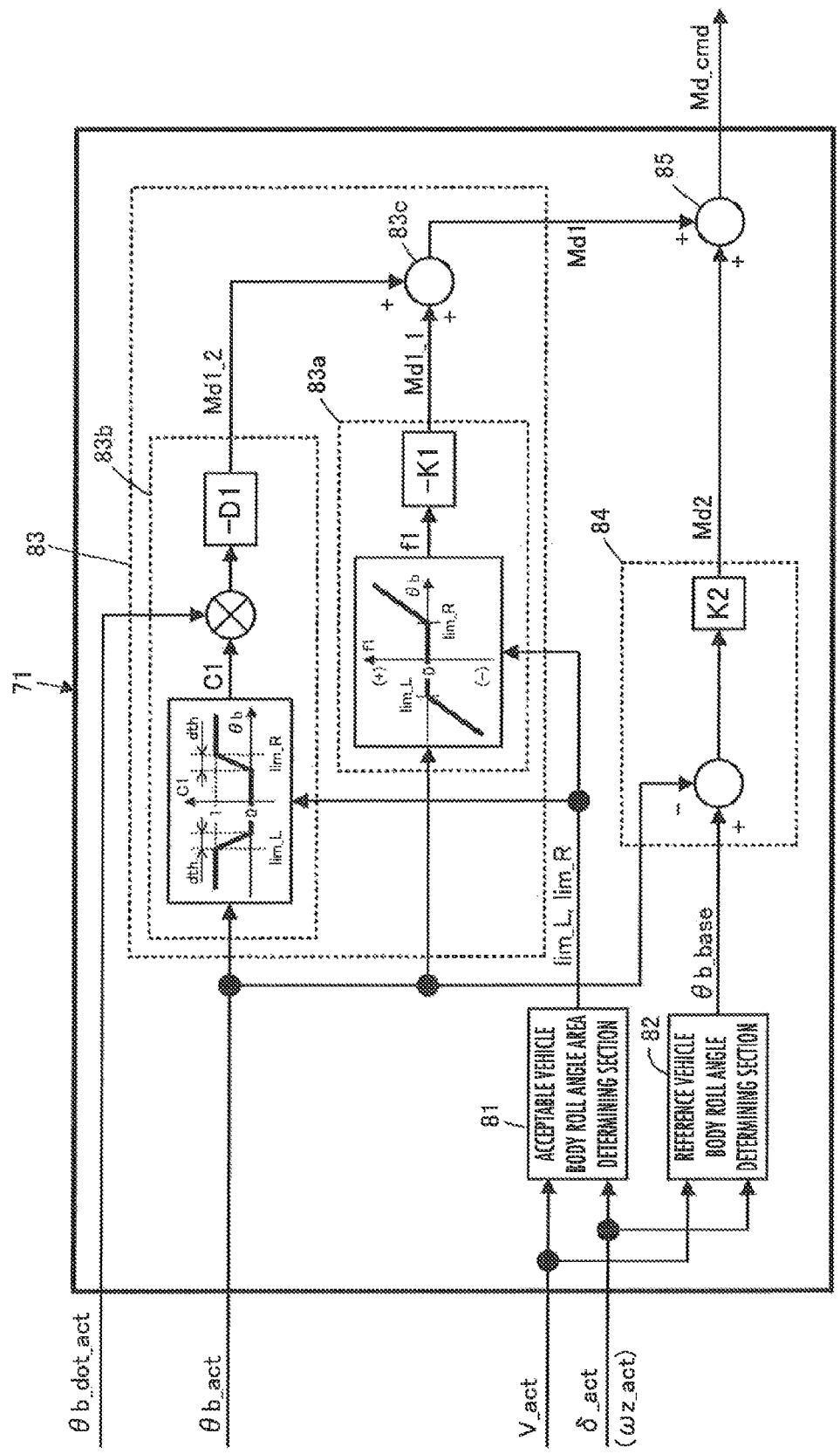
FIG. 4 is a block diagram illustrating the processing performed by the desired roll driving moment determining section shown in FIG. 3.

The desired roll driving moment determining section 71 determines the desired roll driving moment Md_cmd successively, by the processing shown by the block diagram in FIG. 4.

In this case, as shown in FIG. 4, the desired roll driving moment determining section 71 successively receives: a value $\theta b\_act$ (observed value) of a vehicle body roll angle $\theta b$ and a value $\theta b\_dot\_act$ (observed value) of a vehicle body roll angular velocity $\theta b\_dot$, which are recognized by the control device 70 from the output of the vehicle body roll angle sensor 63; a value V_act (observed value) of a vehicle speed V of the mobile vehicle 1, which is recognized by the control device 70 from the output of the vehicle speed sensor 62; and a value $\delta\_act$ (observed value) of a steering angle $\delta$ of the front wheel 4, which is recognized by the control device 70 from the output of the steering angle sensor 61.

It should be noted that a value $\omega z\_act$ (observed value) of a yaw rate $\omega z$, which is shown in FIG. 4 in the parentheses as a value input to the desired roll driving moment determining section 71, relates to another embodiment which will be described later. In the present embodiment, the yaw rate $\omega z\_act$ is not used in the processing in the desired roll driving moment determining section 71, so the aforesaid yaw rate sensor 64 may be omitted.

The desired roll driving moment determining section 71 then successively determines the desired roll driving moment Md_cmd by successively performing the following processing at prescribed control processing cycles: processing in an acceptable vehicle body roll angle area determining section 81 which determines an acceptable vehicle body roll angle area as an appropriate range of the vehicle body roll angle; processing in a reference vehicle body roll angle determining section 82 which determines the aforesaid reference vehicle body roll angle; processing in a first roll driving moment calculating section 83 which determines, as a major component Md1 of the desired roll driving moment Md_cmd, a roll driving moment Md1 (hereinafter, referred to as "roll driving major-component moment Md1") that functions to prevent a deviation of the vehicle body roll angle $\theta b\_act$ from the acceptable vehicle body roll angle area; processing in a second roll driving moment calculating section 84 which determines, as an additive sub-component of the desired roll driving moment Md_cmd, a roll driving moment Md2 (hereinafter, referred to as "roll driving sub-component moment Md2") that functions to make the vehicle body roll angle $\theta b\_act$ approach the reference vehicle body roll angle; and processing in a moment combining section 85 which combines (sums up) the roll driving major-component moment Md1 and the roll driving sub-component moment Md2.

More specifically, at each control processing cycle, the desired roll driving moment determining section 71 first carries out the processing in the acceptable vehicle body roll angle area determining section 81 and the reference vehicle body roll angle determining section 82.

The reference vehicle body roll angle determining section 82 determines a reference vehicle body roll angle $\theta b\_base$ in accordance with the received, current values (latest values) of the vehicle speed V_act and the steering angle $\delta\_act$, by a map (or arithmetic expression) generated in advance.

The map (or arithmetic expression) for use in determination of the reference vehicle body roll angle $\theta b\_base$ defines the relationship between the arbitrary values of the vehicle speed V and the steering angle $\delta$ and the value of the reference vehicle body roll angle $\theta b\_base$.

Figure 5A:
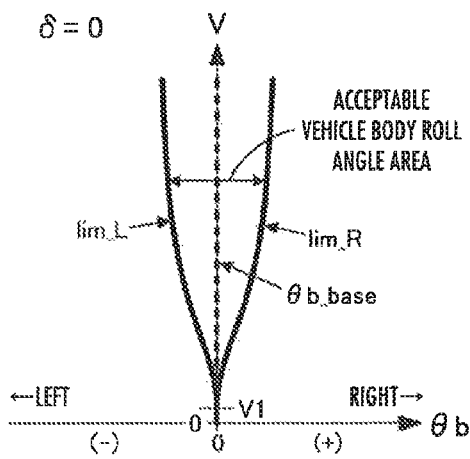
FIGS. 5A, 5B, and 5C are graphs illustrating the processing performed by the acceptable vehicle body roll angle area determining section and the reference vehicle body roll angle determining section shown in FIG. 4 in a first embodiment.
Figure 5B:
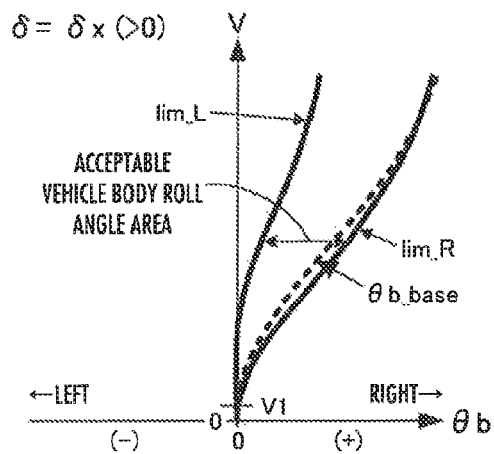
Figure 5C:
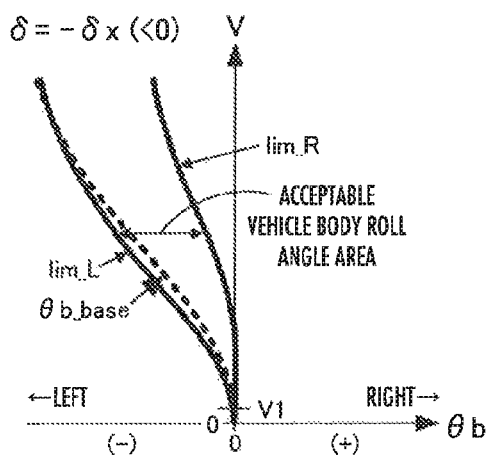

Examples of the above-described relationship defined by the map (or arithmetic expression) are shown in FIGS. 5A, 5B, and 5C. Broken line graphs in FIGS. 5A, 5B, and 5C each show, by way of example, the relationship between the vehicle speed V and the reference vehicle body roll angle $\theta b\_base$ when the steering angle $\delta$ takes a certain value different from each other. FIG. 5A shows an example where $\delta$ is zero, FIG. 5B shows an example where $\delta$ takes a positive value $\delta x$ ($\delta x$ is a representative value), and FIG. 5C shows an example where $\delta$ takes a negative value $-\delta x$.

It should be noted that the solid line graphs in FIGS. 5A, 5B, and 5C each show an acceptable vehicle body roll angle area which is determined by the acceptable vehicle body roll angle area determining section 81 in a manner as will be described later.

The map (or arithmetic expression) for use in determination of the reference vehicle body roll angle $\theta b\_base$ is generated such that the reference vehicle body roll angle $\theta b\_base$ determined thereby approximately coincides with a value of the vehicle body roll angle θb at which the centrifugal force moment defined in accordance with a set of the values of the vehicle speed V and the steering angle δ and the gravitational force moment are balanced (i.e. the resultant moment of the centrifugal force moment and the gravitational force moment becomes zero).

Here, the centrifugal force moment defined in accordance with a set of the values of the vehicle speed V and the steering angle δ means a moment in the roll direction which acts on the vehicle body 3 because of the centrifugal force acting on the overall center of gravity of the mobile vehicle 1 and the operator assuming that the mobile vehicle 1 is traveling with the vehicle speed V and the steering angle δ both maintained at arbitrary values.

The map (or arithmetic expression) for determining the reference vehicle body roll angle θb_base is generated in advance on the basis of a model (dynamic model or kinematic model) of the mobile vehicle 1 or through experiments or the like.

Supplementally, the map (or arithmetic expression) for use in determination of the reference vehicle body roll angle θb_base may be generated, by way of example, so as to make the reference vehicle body roll angle θb_base coincide, with high precision, with the value of the vehicle body roll angle θb at which the centrifugal force moment and the gravitational force moment are balanced. Alternatively, the above-described map (or arithmetic expression) may be generated, in accordance with a design guideline of the behavioral characteristics of the mobile vehicle 1 or the like, such that the reference vehicle body roll angle θb_base is intentionally shifted slightly from the value at which the moments are balanced, within a range not too far from that value.

The reference vehicle body roll angle θb_base determined by the reference vehicle body roll angle determining section 82 in accordance with the vehicle speed V_act and the steering angle δ_act by using the above map (or arithmetic expression) becomes zero when the mobile vehicle 1 is stopped (V_act=0) or traveling straight ahead (δ_act=0), as shown in FIG. 5A.

In the state where the mobile vehicle 1 is making a turn, with δ_act≠0, the reference vehicle body roll angle θb_base is determined, as shown in FIG. 5B or 5C, such that the magnitude (absolute value) of the reference vehicle body roll angle θb_base becomes larger as V_act is larger or as the magnitude (absolute value) of δ_act is larger.

In this case, in the case where δ_act>0 (where the front wheel 4 is steered to the right), the reference vehicle body roll angle θb_base becomes a positive inclination angle (inclination angle in the state where the vehicle body 3 is inclined to the right), as shown in FIG. 5B. In the case where δ_act<0 (where the front wheel 4 is steered to the left), the reference vehicle body roll angle θb_base becomes a negative inclination angle (inclination angle in the state where the vehicle body 3 is inclined to the left), as shown in FIG. 5C.

Supplementally, the reference vehicle body roll angle determining section 82 has the function as the reference vehicle body roll angle setting section in the present invention.

The aforesaid acceptable vehicle body roll angle area determining section 81 determines an acceptable vehicle body roll angle area in accordance with the current values (latest values) of the vehicle speed V_act and the steering angle δ_act, by a map (or arithmetic expression) generated in advance. It should be noted that the acceptable vehicle body roll angle area may be determined by directly determining an upper limit lim_R and a lower limit lim_L of the acceptable vehicle body roll angle area, or by determining parameters defining the upper limit lim_R and the lower limit lim_L (for example, a set of the center value and width of the acceptable vehicle body roll angle area).

The above-described map (or arithmetic expression) for use in determination of the acceptable vehicle body roll angle area defines the relationship between the arbitrary values of the vehicle speed V and the steering angle δ and the upper limit lim_R and the lower limit lim_L of the acceptable vehicle body roll angle area.

Examples of the above-described relationship defined by the map (or arithmetic expression) are shown by the solid line graphs in FIGS. 5A, 5B, and 5C. The solid line graphs in FIGS. 5A, 5B, and 5C each show, by way of example, the relationship between the vehicle speed V and the upper limit lim_R and the lower limit lim_L of the acceptable vehicle body roll angle area when the steering angle δ takes a certain value different from each other. As explained above, FIGS. 5A, 5B, and 5C show the cases where δ is zero, δ is a positive value δx, and δ is a negative value −δx, respectively.

The map (or arithmetic expression) for determining the acceptable vehicle body roll angle area is generated such that the acceptable vehicle body roll angle area is determined by the acceptable vehicle body roll angle area determining section 81 with respect to the values of the vehicle speed V and the steering angle δ with the following trend.

The acceptable vehicle body roll angle area is determined, as shown in FIGS. 5A, 5B, and 5C by way of example, such that the width of the acceptable vehicle body roll angle area, which is the difference (=lim_R−lim_L) between the upper limit lim_R and the lower limit lim_L of the acceptable vehicle body roll angle area, becomes smaller as the value V_act of the vehicle speed V is smaller (closer to zero).

More specifically, in the present embodiment, in the state where the vehicle speed V_act is lower than a first prescribed vehicle speed V1 determined in advance (i.e. in the state where the mobile vehicle 1 is stopped or traveling at a very low speed), the acceptable vehicle body roll angle area is determined as an area the width of which is zero. In other words, the acceptable vehicle body roll angle area is determined as an area in which the upper limit lim_R and the lower limit lim_L take the same value.

In the present embodiment, the upper limit lim_R and the lower limit lim_L of the acceptable vehicle body roll angle area in this case are determined to be a value which coincides with the reference vehicle body roll angle θb_base.

The acceptable vehicle body roll angle area is determined such that, in the case where the value V_act of the vehicle speed V is not smaller than the above-described first prescribed vehicle speed V1, the width of the acceptable vehicle body roll angle area increases from zero with increasing vehicle speed V_act (in other words, such that the width of the acceptable vehicle body roll angle area approaches zero from a value other than zero with decreasing vehicle speed V_act).

Furthermore, in the case where the vehicle speed V_act is higher than the first prescribed vehicle speed V1, when the mobile vehicle 1 is traveling straight ahead (where δ_act=0), the acceptable vehicle body roll angle area is determined to satisfy the following: lim_R>0 and lim_L<0, and |lim_R|=|lim_L|, as shown in FIG. 5A. In other words, the acceptable vehicle body roll angle area is determined such that the center value (=(lim_R+lim_L)/2) of the acceptable vehicle body roll angle area becomes zero (=reference vehicle body roll angle θb_base).

Further, in the case where the vehicle speed V_act is higher than the first prescribed vehicle speed V1, when the mobile vehicle 1 is making a turn with: δ_act>0 or δ_act<0, the acceptable vehicle body roll angle area is determined such that the center value of the acceptable vehicle body roll angle area becomes a vehicle body roll angle (of the same polarity as δ_act) making the vehicle body 3 inclined to the same side as the turning direction of the mobile vehicle 1, as shown in FIG. 5B or 5C, and such that the magnitude (absolute value) of the center value of the acceptable vehicle body roll angle area becomes larger as the magnitude (absolute value) of the steering angle δ_act is larger.

Further, in the case where the vehicle speed V_act is higher than the first prescribed vehicle speed V1, when the mobile vehicle 1 is making a turn with: δ_act>0 (making a turn to the right), the acceptable vehicle body roll angle area is determined, as shown in FIG. 5B, such that, of the upper limit lim_R and the lower limit lim_L of the acceptable vehicle body roll angle area, the upper limit lim_R corresponding to the right-side limit (the limit on the same side as the turning direction) becomes closer to the reference vehicle body roll angle θb_base as compared with the lower limit lim_L corresponding to the left-side limit (in other words, such that the magnitude (absolute value) of the center value of the acceptable vehicle body roll angle area becomes smaller than the magnitude (absolute value) of the reference vehicle body roll angle θb_base).

Further, in the case where the vehicle speed V_act is higher than the first prescribed vehicle speed V1, when the mobile vehicle 1 is making a turn with: δ_act<0 (making a turn to the left), the acceptable vehicle body roll angle area is determined, as shown in FIG. 5C, such that, of the upper limit lim_R and the lower limit lim_L of the acceptable vehicle body roll angle area, the lower limit lim_L corresponding to the left-side limit (the limit on the same side as the turning direction) becomes closer to the reference vehicle body roll angle θb_base as compared with the upper limit lim_R corresponding to the right-side limit (in other words, such that the magnitude (absolute value) of the center value of the acceptable vehicle body roll angle area becomes smaller than the magnitude (absolute value) of the reference vehicle body roll angle θb_base).

It should be noted that in the present embodiment, the map (or arithmetic expression) for use in determination of the acceptable vehicle body roll angle area is generated such that the acceptable vehicle body roll angle area falls between: the value (<0) of the vehicle body roll angle θb at which the centrifugal force moment and the gravitational force moment should be balanced when the mobile vehicle 1 makes a turn to the left in the state where the front wheel 4 has been steered to the left to the greatest possible extent (to the structural limit), and the value (>0) of the vehicle body roll angle θb at which the centrifugal force moment and the gravitational force moment should be balanced when the mobile vehicle 1 makes a turn to the right in the state where the front wheel 4 has been steered to the right to the greatest possible extent (to the structural limit).

This is for preventing the vehicle body 3 from unnecessarily inclining to the right or left.

Supplementally, the acceptable vehicle body roll angle area determining section 81 has the function as the vehicle body roll angle area setting section in the present invention. In this case, the acceptable vehicle body roll angle area determined by the acceptable vehicle body roll angle area determining section 81 corresponds to the first vehicle body roll angle area in the present invention.

It should be noted that the acceptable vehicle body roll angle area may be set in such a manner that the reference vehicle body roll angle θb_base slightly deviates from the acceptable vehicle body roll angle area partially (or, within a partial range of the vehicle speed V or the steering angle δ). For example, the acceptable vehicle body roll angle area shown in FIG. 5B or 5C is set such that the reference vehicle body roll angle θb_base slightly deviates from the acceptable vehicle body roll angle area in the range where the vehicle speed V_act becomes high.

Alternatively, the acceptable vehicle body roll angle area may be set such that the reference vehicle body roll angle θb_base is always within the acceptable vehicle body roll angle area.

Next, the desired roll driving moment determining section 71 carries out the processing in the first roll driving moment calculating section 83 and the second roll driving moment calculating section 84.

The first roll driving moment calculating section 83 receives the current (latest) vehicle body roll angle θb_act (observed value) and vehicle body roll angular velocity θb_dot_act (observed value), and also receives the upper limit lim_R and the lower limit lim_L of the latest acceptable vehicle body roll angle area determined in the acceptable vehicle body roll angle area determining section 81.

The first roll driving moment calculating section 83 then determines, as constituent components of the roll driving major-component moment Md1, a first component Md1_1, which depends on the deviation state of the vehicle body roll angle θb_act from the acceptable vehicle body roll angle area, and a second component Md1_2, which depends on the vehicle body roll angular velocity θb_dot_act, by processing sections 83a and 83b, respectively. Further, the first roll driving moment calculating section 83 combines (sums up) the calculated first component Md1_1 and second component Md1_2 in an arithmetic section 83c, to determine a roll driving major-component moment Md1 (=Md1_1+Md1_2).

The first component Md1_1 is determined by the processing section 83a in the following manner. First, a deviation state quantity f1 which indicates the deviation state (presence/absence of deviation, the degree of the deviation, and the direction of the deviation) of the vehicle body roll angle θb_base from the acceptable vehicle body roll angle area is determined, as shown by the graph illustrated in the processing section 83a. More specifically, the deviation state quantity f1 is determined, in accordance with the comparison between θb_act and the acceptable vehicle body roll angle area, by one of the following expressions (1a), (1b), and (1c).

When lim_L≤θb_act≤lim_R:

$$f1=0 \tag{1a}$$

When θb_act<lim_L:

$$f1=\theta b\_act - lim\_L \tag{1b}$$

When θb_act>lim_R:

$$f1=\theta b\_act - lim\_R \tag{1c}$$

As such, in the present embodiment, in the state where the vehicle body roll angle θb_act falls within the acceptable vehicle body roll angle area, the deviation state quantity f1 is set to zero, whereas in the state where the vehicle body roll angle θb_act falls outside the acceptable vehicle body roll angle area, the amount of deviation (the degree of the deviation) is determined as the deviation state quantity f1. In this case, whether the vehicle body roll angle θb_act deviates on the upper limit lim_R side or the lower limit lim_L side (the direction of the deviation) is indicated by the polarity of f1.

It should be noted that the deviation state quantity f1 may be calculated using a map.

The processing section 83a then calculates a first component Md1_1 by multiplying the deviation state quantity f1 determined as described above by a predetermined gain (−K1) of a prescribed negative value.

That is, the first component Md1_1 is calculated by the following expression (2).

$$Md1\_1 = -K1 \times f1 \quad (2)$$

The first component Md1_1 calculated in this manner becomes zero in the case where lim_L≤θb_act≤lim_R (i.e. in the case where θb_act falls within the acceptable vehicle body roll angle area).

On the other hand, in the case where θb_act<lim_L or θb_act>lim_R (i.e. in the case where θb_act falls outside the acceptable vehicle body roll angle area), the calculated first component Md1_1 becomes a moment in the roll direction having the polarity opposite to that of the deviation state quantity f1, i.e. the moment in the roll direction in the direction of causing the vehicle body roll angle θb_act to return to within the acceptable vehicle body roll angle area. Further, the magnitude of the first component Md1_1 in this case becomes larger as the magnitude (absolute value) of the deviation state quantity f1 is larger.

Here, in the present embodiment, in the situation where the vehicle body roll angle θb_act falls outside the acceptable vehicle body roll angle area, the magnitude of the aforesaid gain K1 corresponds to the sensitivity of the change in first component Md1_1 to the change in vehicle body roll angle θb_act (i.e. amount of change of Md1_1 per unit change amount of θb_act). In the present embodiment, the magnitude of the gain K1 is preset so as to be sufficiently larger than the sensitivity of the change in the aforesaid gravitational force moment to the change in vehicle body roll angle θb_act.

Therefore, in the case where the vehicle body roll angle θb_act deviates from the acceptable vehicle body roll angle area, when the magnitude of the amount of deviation has increased to a certain level, the first component Md1_1 becomes a moment that can make the vehicle body roll angle θb_act return to within the acceptable vehicle body roll angle area, against the gravitational force moment.

Supplementally, the first component Md1_1 may be determined using a map from, for example, θb_dot_act (observed value), θb_act (observed value), and the set values of lim_L and lim_R (or the parameters defining them).

Further, the aforesaid second component Md1_2 is determined by the processing section 83b in the following manner. First, an adjustment factor C1 (≤1) by which the vehicle body roll angular velocity θb_dot_act is to be multiplied is determined in accordance with the vehicle body roll angle θb_act, as shown by the graph illustrated in the processing section 83b. More specifically, the adjustment factor C1 is determined in accordance with the comparison between θb_act and the acceptable vehicle body roll angle area, by one of the following expressions (3a), (3b), (3c), and (3d). It should be noted that dth represents a prescribed positive value determined in advance.

When θb_act>lim_R, or when θb_act<lim_L:

$$C1 = 1 \quad (3a)$$

When lim_R−lim_L>2×dth and lim_L+dth≤θb_act≤lim_R−dth:

$$C=1=0 \quad (3b)$$

When lim_R−lim_L>2×dth and lim_L≤θb_act<lim_L+dth, or when lim_R−lim_L≤2×dth and lim_L≤θb_act<(lim_L+lim_R)/2:

$$C1 = 1 - (\theta b_{act} - \text{lim}\_L)/dth \quad (3c)$$

When lim_R−lim_L>2×dth and lim_R−dth<θb_act≤lim_R, or when lim_R−lim_L≤2×dth and (lim_L+lim_R)/2≤θb_act≤lim_R:

$$C1 = 1 - (\text{lim}\_R - \theta b\_act)/dth \quad (3d)$$

With the adjustment factor C1 determined in this manner, in the case where the vehicle body roll angle θb_act falls outside the acceptable vehicle body roll angle area, the adjustment factor C1 is determined to be "1". In the case where the vehicle body roll angle θb_act falls within the acceptable vehicle body roll angle area and takes a value relatively close to the upper limit lim_R or the lower limit lim_L (i.e. when the absolute value of the difference with lim_R or lim_L is not larger than the prescribed value dth), the adjustment factor C1 is determined so as to approach "1" from zero or a value closer to zero as the vehicle body roll angle θb_act further approaches the upper limit lim_R or the lower limit lim_L.

It should be noted that the adjustment factor C1 may be determined using a map.

The processing section 83b then calculates a second component Md1_2 by multiplying the vehicle body roll angular velocity θb_dot_act by the adjustment factor C1 determined as described above, and further multiplying the resultant value by a predetermined gain (−D1) of a prescribed negative value.

That is, the second component Md1_2 is calculated by the following expression (4).

$$Md1\_2 = -D1 \times C1 \times \theta b\_\text{dot}\_act \quad (4)$$

The second component Md1_2 calculated in this manner becomes a braking moment in the roll direction which functions to make the vehicle body roll angular velocity θb_dot_act approach zero (or, decelerate) in the case where the vehicle body roll angle θb_act falls outside the acceptable vehicle body roll angle area, or in the case where the vehicle body roll angle θb_act falls within the acceptable vehicle body roll angle area and takes a value relatively close to the upper limit lim_R or the lower limit lim_L (more specifically, the absolute value of the difference with lim_R or lim_L is not larger than the prescribed value dth).

Further, in the situation where the vehicle body roll angle θb_act is within the acceptable vehicle body roll angle area and takes a value not so close to the upper limit lim_R or the lower limit lim_L, the second component Md1_2 becomes zero.

Supplementally, the second component Md1_2 may be determined using a map from, for example, θb_act (observed value), and the set values of lim_L and lim_R (or the parameters defining them).

The first roll driving moment calculating section 83 sums up the first component Md1_1 and the second component Md1_2 calculated in the above-described manner, as shown by the following expression (5), to calculate a roll driving major-component moment Md1.

$$Md1 = Md1\_1 + Md1\_2 \quad (5)$$

Supplementally, the first roll driving moment calculating section 83 has the functions as the first manipulated variable determining section and the vehicle body roll angle deviation state quantity calculating section in the present invention. In this case, of the processing performed by the first roll driving moment calculating section 83, the processing of calculating the deviation state quantity f1 corresponds to the function as the vehicle body roll angle deviation state quantity calculating section. Further, the roll driving major-component moment Md1 determined by the first roll driving moment calculating section 83 corresponds to the first manipulated variable in the present invention.

Next, the processing performed by the second roll driving moment calculating section 84 will be described. The second roll driving moment calculating section 84 receives the current (latest) vehicle body roll angle θb_act (observed value), and also receives the latest reference vehicle body roll angle θb_base determined in the reference vehicle body roll angle determining section 82.

The second roll driving moment calculating section 84 then calculates a roll driving sub-component moment Md2 by multiplying the deviation of the vehicle body roll angle θb_act from the reference vehicle body roll angle θb_base by a predetermined gain K2 of a prescribed positive value, as shown in FIG. 4.

That is, the roll driving sub-component moment Md2 is calculated by the following expression (6).

$$Md2 = K2 \times (\theta b\_base - \theta b\_act) \quad (6)$$

With the roll driving sub-component moment Md2 calculated in this manner, Md2 becomes a moment in the roll direction which functions to make the vehicle body roll angle θb_act approach the reference vehicle body roll angle θb_base.

Here, in the present embodiment, the magnitude of the gain K2 in the expression (6) corresponds to the sensitivity of the change in roll driving sub-component moment Md2 to the change in vehicle body roll angle θb_act (i.e. amount of change of Md2 per unit change amount of θb_act). Further, in the present embodiment, the magnitude of the gain K2 is preset so as to be smaller than the sensitivity of the change in the aforesaid gravitational force moment to the change in vehicle body roll angle θb_act.

It should be noted that the roll driving sub-component moment Md2 may be determined using a map from θb_act (observed value) and θb_base (set value).

Supplementally, the second roll driving moment calculating section 84 has the function as the second manipulated variable determining section in the present invention. In this case, the roll driving sub-component moment Md2 determined by the second roll driving moment calculating section 84 corresponds to the second manipulated variable in the present invention.

The desired roll driving moment determining section 71 calculates the roll driving major-component moment Md1 and the roll driving sub-component moment Md2 in the above-described manner, and then carries out the processing in the moment combining section 85.

The moment combining section 85 determines a desired roll driving moment Md_cmd by summing up the calculated Md1 and Md2, as shown by the following expression (7).

$$Md\_cmd = Md1 + Md2 \quad (7)$$

The above has described the details of the processing in the desired roll driving moment determining section 71.

Figure 6A:
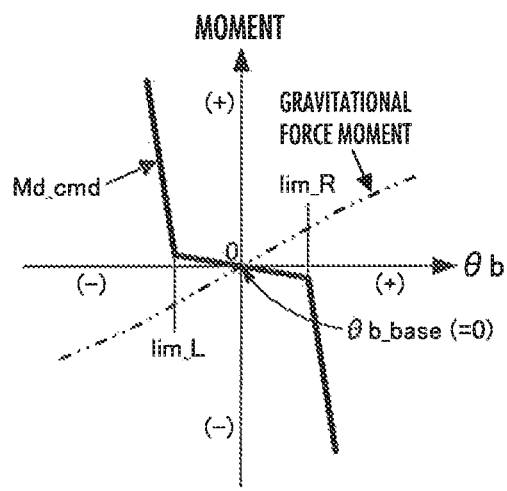
FIGS. 6A and 6B are graphs illustrating exemplary function characteristics of the roll driving moment with respect to the vehicle body roll angle.
Figure 6B:
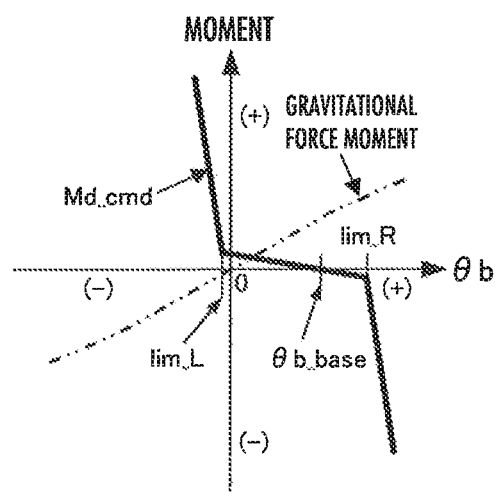

The relationship between the desired roll driving moment Md_cmd determined through the above-described processing and the vehicle body roll angle θb (function characteristics of Md_cmd with respect to θb) has the characteristics approximately as shown by the solid line graph in FIG. 6A or 6B.

It should be noted that FIG. 6A shows exemplary characteristics in the state where the mobile vehicle 1 is traveling straight ahead, and FIG. 6B shows exemplary characteristics in the state where the mobile vehicle 1 is making a turn (to the right). In FIGS. 6A and 6B, for convenience of explanation, the vehicle body roll angular velocity θb_dot_act is set to be zero or almost zero (and, hence, Md_1≈0).

Further, the two-dot chain line graphs in FIGS. 6A and 6B show, by way of example, the relationship between the gravitational force moment and the vehicle body roll angle θb. The gravitational force moment is roughly proportional to a sine value sin(θb) of the vehicle body roll angle θb. Accordingly, when the magnitude of θb is sufficiently small, the gravitational force moment is approximately proportional to θb.

As shown in FIGS. 6A and 6B by way of example, the desired roll driving moment Md_cmd is determined to become a function which monotonically changes (in the present embodiment, monotonically decreases) with respect to the vehicle body roll angle θb.

Further, as the aforesaid gains K1 and K2 have been set in the above-described manner, in the case where the value θb_act of the vehicle body roll angle θb falls within the acceptable vehicle body roll angle area, the sensitivity ("roll driving moment sensitivity") of the change in Md_cmd to the change in vehicle body roll angle θb becomes small as compared with the sensitivity ("gravitational force moment sensitivity") of the change in the gravitational force moment to the change in vehicle body roll angle θb. Further, in the case where the value θb_act of the vehicle body roll angle θb falls outside the acceptable vehicle body roll angle area, the roll driving moment sensitivity becomes large as compared with the gravitational force moment sensitivity.

Therefore, the function characteristics of the desired roll driving moment Md_cmd with respect to the vehicle body roll angle θb have the aforesaid properties A to D in the present invention.

It should be noted that in this case, the acceptable vehicle body roll angle area, the range of the vehicle body roll angle θb larger than the upper limit lim_R of the acceptable vehicle body roll angle area, and the range of the vehicle body roll angle θb smaller than the lower limit lim_L of the acceptable vehicle body roll angle area correspond to the first vehicle body roll angle area, the second vehicle body roll angle area, and the third vehicle body roll angle area, respectively, in the present invention.

Next, the processing in the aforesaid motor command determining section 72 will be described. The motor command determining section 72 determines a torque command value Tm_cmd of the electric motor 33 successively, by the processing shown by the block diagram in FIG. 7.

Figure 7:
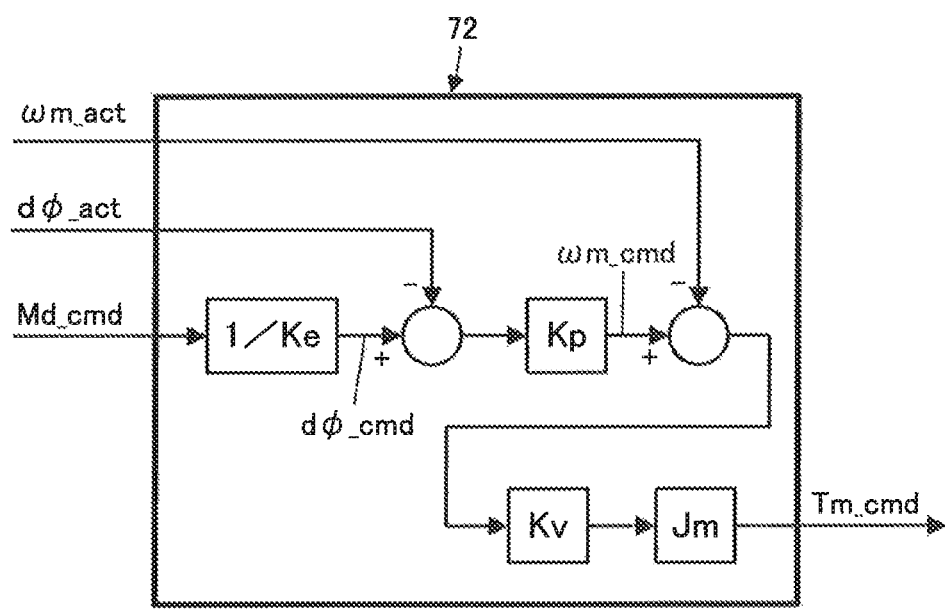
FIG. 7 is a block diagram illustrating the processing performed by the motor command determining section shown in FIG. 3.

In this case, as shown in FIG. 7, the motor command determining section 72 successively receives: the desired roll driving moment Md_cmd determined by the desired roll driving moment determining section 71; a value (observed value) of a coupling twist angle dφ_act, which is recognized by the control device 70 from the output of the aforesaid coupling twist angle sensor 65; and a value (observed value) of a rotational speed ωm_act of the rotor of the electric motor 33, which is recognized by the control device 70 from the output of the aforesaid motor-side rotational speed sensor 66.

At each control processing cycle, as shown in FIG. 7, the motor command determining section 72 multiplies the desired roll driving moment Md_cmd by the inverse of a prescribed value Ke to calculate a desired value dφ_cmd of the coupling twist angle dφ. That is, the motor command determining section 72 converts the desired roll driving moment Md_cmd to the desired value dφ_cmd of the coupling twist angle dφ by the following expression (8a).

$$d\phi\_cmd = (1/Ke) \times Md\_cmd \quad (8a)$$

The above-described Ke is a prescribed value which has been preset as a value of elastic deformation coefficient (so-called spring constant) between the input side and the output side of the coupling 44.

Then, as shown in FIG. 7, the motor command determining section 72 multiples the deviation of the observed value dφ_act of the coupling twist angle dφ from the desired value dφ_cmd by a predetermined gain Kp of a prescribed value, to calculate a desired value ωm_cmd of the rotational speed of the rotor of the electric motor 33. That is, the motor command determining section 72 calculates the desired value ωm_cmd of the rotational speed of the rotor of the electric motor 33 by the following expression (8b).

$$\omega m\_cmd = Kp \times (d\phi\_cmd - d\phi\_act) \tag{8b}$$

Further, as shown in FIG. 7, the motor command determining section 72 multiplies the deviation of the observed value ωm_act of the rotational speed ωm of the rotor of the electric motor 33 from the desired value ωm_cmd by a predetermined gain Kv of a prescribed value and a predetermined moment of inertia, Jm, of the rotor of the electric motor 33, to thereby calculate a torque command value Tm_cmd of the electric motor 33. That is, the motor command determining section 72 calculates the torque command value Tm_cmd by the following expression (8c).

$$Tm\_cmd = Jm \times Kv \times (\omega m\_cmd - \omega m\_act) \tag{8c}$$

The above has described the details of the processing in the motor command determining section 72.

Supplementally, the torque command value Tm_cmd may be determined using a map from ωm_act (observed value), dφ_act (observed value), and Md_cmd (set value).

According to the present embodiment described above, while the mobile vehicle 1 is traveling (traveling straight ahead or making a turn), in the state where the vehicle body roll angle θb_act falls within the acceptable vehicle body roll angle area, the desired roll driving moment Md_cmd coincides, or almost coincides, with the roll driving sub-component moment Md2, as long as the second component Md1_2 (component depending on the vehicle body roll angular velocity θb_dot_act) of the roll driving major-component moment Md1 is maintained at zero or a value close to zero.

In this case, the roll driving sub-component moment Md2 becomes zero or small. Therefore, the operator can relatively easily change the vehicle body roll angle θb_act to a desired inclination angle by shifting his/her body weight.

In the situation where the operator has not intentionally shifted the body weight, when the vehicle body roll angle θb_act differs from the reference vehicle body roll angle θb_base, the roll driving moment (≈Md2) acts on the vehicle body 3, by the control of the electric motor 33 of the roll driving mechanism 23, in such a way as to make the vehicle body roll angle θb_act approach the reference vehicle body roll angle θb_base. As a result, the vehicle body roll angle θb_act is likely to be kept at an inclination angle in the vicinity of the reference vehicle body roll angle θb_base which is suitable for the traveling state of the mobile vehicle 1.

On the other hand, in the case where the vehicle body roll angle θb_act has deviated from the acceptable vehicle body roll angle area, the roll driving major-component moment Md1 for causing the vehicle body roll angle θb_act to return to within the acceptable vehicle body roll angle area quickly increases in magnitude. Consequently, the desired roll driving moment Md_cmd becomes a value close to the roll driving major-component moment Md1.

In this case, the roll driving major-component moment Md1 becomes relatively large. Therefore, a further deviation of the vehicle body roll angle θb_act from the acceptable vehicle body roll angle area is firmly prevented.

Further, the width of the acceptable vehicle body roll angle area becomes smaller as the vehicle speed V_act is lower. Therefore, as the vehicle speed V_act is lower, the vehicle body roll angle θb_act can be more firmly maintained at an inclination angle close to the reference vehicle body roll angle θb_base.

In the situation where the vehicle body roll angle θb_act is about to fall outside the acceptable vehicle body roll angle area (more specifically, in the situation where the vehicle body roll angle θb_act is changing toward the upper limit lim_R or the lower limit lim_L near the upper limit lim_R or the lower limit lim_L in the acceptable vehicle body roll angle area), a roll driving moment for braking the change of the vehicle body roll angle θb_act acts on the vehicle body 3 by the second component Md1_2 (component depending on the vehicle body roll angular velocity θb_dot_act) of the roll driving major-component moment Md1. Accordingly, it is possible to prevent the deviation of the vehicle body roll angle θb_act from the acceptable vehicle body roll angle area, from just before the deviation takes place.

When the mobile vehicle 1 is making a turn to the right, the upper limit lim_R as the right-side limit of the acceptable vehicle body roll angle area becomes closer to the reference vehicle body roll angle θb_base as compared with the lower limit lim_L. When the mobile vehicle 1 is making a turn to the left, the lower limit lim_L as the left-side limit of the acceptable vehicle body roll angle area becomes closer to the reference vehicle body roll angle θb_base as compared with the upper limit lim_R.

Accordingly, while the mobile vehicle 1 is making a turn, the vehicle body 3 can be prevented from being overly inclined to the same side as the turning direction.

Second Embodiment

A second embodiment of the present invention will now be described. It should be noted that the present embodiment differs from the first embodiment only in the processing for determining the acceptable vehicle body roll angle area and the reference vehicle body roll angle. Therefore, the present embodiment will be described focusing on the differences from the first embodiment, and the description of the same matters as in the first embodiment will be omitted.

In the present embodiment, the acceptable vehicle body roll angle area determining section 81 and the reference vehicle body roll angle determining section 82 in the desired roll driving moment determining section 71 successively receive, instead of the steering angle δ_act of the front wheel 4, a value (observed value) of a yaw rate ωz_act (see "ωz_act" in the parentheses in FIG. 4), which is recognized by the control device 70 from the output of the yaw rate sensor 64.

At each control processing cycle, the reference vehicle body roll angle determining section 82 determines a reference vehicle body roll angle θb_base in accordance with the received current values (latest values) of the vehicle speed V_act and the yaw rate ωz_act, by a map (or arithmetic expression) generated in advance.

This map (or arithmetic expression) defines the relationship between the arbitrary values of the vehicle speed V and the yaw rate ωz and the value of the reference vehicle body roll angle θb_base.

Figure 8A:
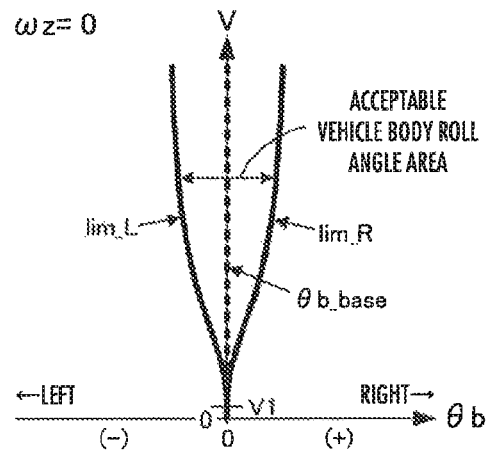
FIGS. 8A, 8B, and 8C are graphs illustrating the processing performed by the acceptable vehicle body roll angle area determining section and the reference vehicle body roll angle determining section shown in FIG. 4 in a second embodiment.
Figure 8B:
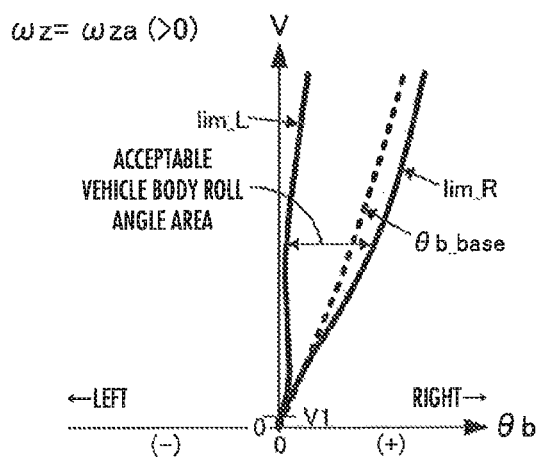
Figure 8C:
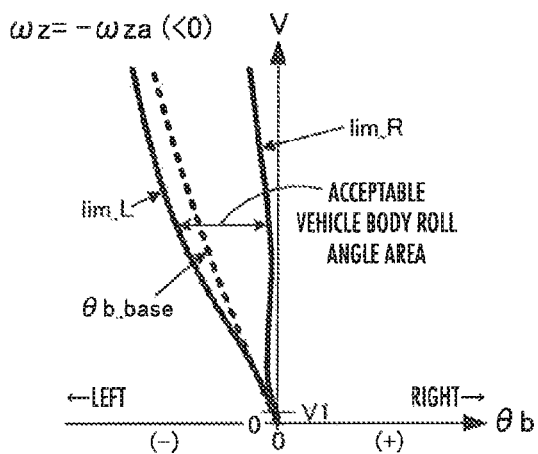

Examples of the above-described relationship defined by the map (or arithmetic expression) are shown in FIGS. 8A, 8B, and 8C. Broken line graphs in FIGS. 8A, 8B, and 8C show, by way of example, the relationship between the vehicle speed V and the reference vehicle body roll angle θb_base when the yaw rate ωz is maintained at zero, when ωz is maintained at a positive value ωza (ωza is a representative value), and when ωz is maintained at a negative value −ωza, respectively.

The map (or arithmetic expression) for use in determination of the reference vehicle body roll angle θb_base is generated such that the reference vehicle body roll angle θb_base determined thereby coincides with a value of the vehicle body roll angle θb at which the centrifugal force moment, defined in accordance with a set of the values of the vehicle speed V and the yaw rate ωz, and the gravitational force moment are balanced (i.e. the resultant moment of the centrifugal force moment and the gravitational force moment becomes zero or almost zero).

The reference vehicle body roll angle θb_base determined by the reference vehicle body roll angle determining section 82 in accordance with the vehicle speed V_act and the yaw rate ωz_act by using the map (or arithmetic expression) becomes zero when the mobile vehicle 1 is stopped (V_act=0) or traveling straight ahead (ωz_act=0), as shown in FIG. 8A, as in the first embodiment.

In the state where the mobile vehicle 1 is making a turn, with ωz_act≠0, the reference vehicle body roll angle θb_base is determined, as shown in FIG. 8B or 8C, such that the magnitude (absolute value) of the reference vehicle body roll angle θb_base becomes larger as V_act is larger or as the magnitude (absolute value) of ωz_act is larger. In this case, in the case where ωz_act>0 (where the vehicle is making a turn to the right), the reference vehicle body roll angle θb_base becomes a positive inclination angle (inclination angle in the state where the vehicle body 3 is inclined to the right), as shown in FIG. 8B. In the case where ωz_act<0 (where the vehicle is making a turn to the left), the reference vehicle body roll angle θb_base becomes a negative inclination angle (inclination angle in the state where the vehicle body 3 is inclined to the left), as shown in FIG. 8C.

Further, in the present embodiment, the aforesaid acceptable vehicle body roll angle area determining section 81 determines an acceptable vehicle body roll angle area in accordance with the current values (latest values) of the vehicle speed V_act and the yaw rate ωz_act, by a map (or arithmetic expression) generated in advance.

This map (or arithmetic expression) defines the relationship between the arbitrary values of the vehicle speed V and the yaw rate ωz and the upper limit lim_R and the lower limit lim_L of the acceptable vehicle body roll angle area.

Examples of the above-described relationship defined by the map (or arithmetic expression) (examples in the case where the yaw rate ωz is maintained at zero, at a positive value ωza, and at a negative value −ωza, respectively) are shown by the solid line graphs in FIGS. 8A, 8B, and 8C.

The characteristics of the changes of the upper limit lim_R and the lower limit lim_L of the acceptable vehicle body roll angle area determined by the above map (or arithmetic expression) with respect to the vehicle speed V are identical to those in the first embodiment.

As to the characteristics of the changes of the upper limit lim_R and the lower limit lim_L of the acceptable vehicle body roll angle area with respect to the yaw rate ωz, in the case where the vehicle speed V_act is higher than the above-described first prescribed vehicle speed V1, when the mobile vehicle 1 is making a turn, with ωz_act>0 or ωz_act<0, the acceptable vehicle body roll angle area is determined, as shown in FIG. 8B or 8C, such that the center value of the acceptable vehicle body roll angle area becomes a vehicle body roll angle (of the same polarity as ωz_act) making the vehicle body 3 inclined to the same side as the turning direction of the mobile vehicle 1, and such that the magnitude (absolute value) of the center value of the acceptable vehicle body roll angle area becomes larger as the magnitude (absolute value) of the yaw rate ωz_act is larger.

Further, in the case where the vehicle speed V_act is higher than the first prescribed vehicle speed V1, when the mobile vehicle 1 is making a turn with: ωz_act>0 (making a turn to the right), the acceptable vehicle body roll angle area is determined, as shown in FIG. 8B, such that, of the upper limit lim_R and the lower limit lim_L of the acceptable vehicle body roll angle area, the upper limit lim_R corresponding to the right-side limit (the limit on the same side as the turning direction) becomes closer to the reference vehicle body roll angle θb_base as compared with the lower limit lim_L corresponding to the left-side limit (in other words, such that the magnitude (absolute value) of the center value of the acceptable vehicle body roll angle area becomes smaller than the magnitude (absolute value) of the reference vehicle body roll angle θb_base).

Further, in the case where the vehicle speed V_act is higher than the first prescribed vehicle speed V1, when the mobile vehicle 1 is making a turn with: ωz_act<0 (making a turn to the left), the acceptable vehicle body roll angle area is determined, as shown in FIG. 8C, such that, of the upper limit lim_R and the lower limit lim_L of the acceptable vehicle body roll angle area, the lower limit lim_L corresponding to the left-side limit (the limit on the same side as the turning direction) becomes closer to the reference vehicle body roll angle θb_base as compared with the upper limit lim_R corresponding to the right-side limit (in other words, such that the magnitude (absolute value) of the center value of the acceptable vehicle body roll angle area becomes smaller than the magnitude (absolute value) of the reference vehicle body roll angle θb_base).

The present embodiment is identical to the first embodiment except for the matters described above.

According to the present embodiment as well, it is possible to achieve the effects similar to those in the first embodiment.

It should be noted that in the present embodiment, the acceptable vehicle body roll angle area is set such that the reference vehicle body roll angle θb_base is always within the acceptable vehicle body roll angle area, as shown in FIGS. 8A, 8B, and 8C. Alternatively, the acceptable vehicle body roll angle area may be set in such a manner that the reference vehicle body roll angle θb_base slightly deviates from the acceptable vehicle body roll angle area partially (or, within a partial range of the vehicle speed V or the yaw rate ωz).

Third Embodiment

A third embodiment of the present invention will now be described. It should be noted that the present embodiment differs from the first embodiment only in the processing for determining the reference vehicle body roll angle θb_base. Therefore, the present embodiment will be described focusing on the differences, and the description of the same matters as in the first embodiment will be omitted.

In the aforesaid first embodiment, the reference vehicle body roll angle θb_base is determined to be zero when the vehicle speed V_act is zero, irrespective of the steering angle δ_act of the front wheel 4.

Figure 9A:
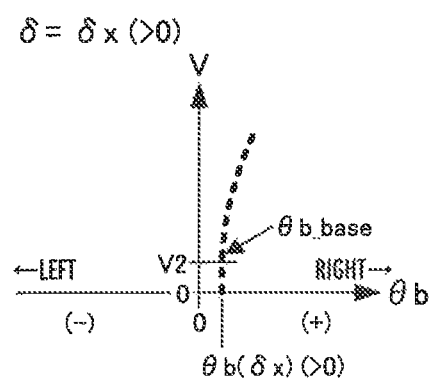
FIGS. 9A and 9B are graphs illustrating a third embodiment.
Figure 9B:
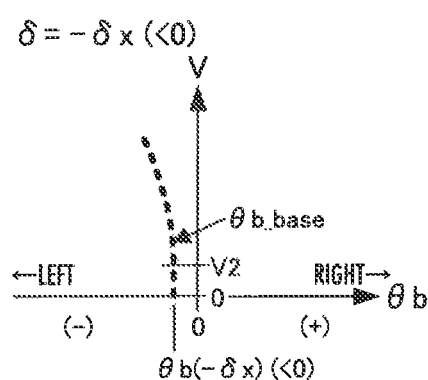

In contrast, in the present embodiment, in the state where the mobile vehicle 1 is stopped or traveling at a very low speed, i.e. in the state where the vehicle speed V_act is lower than a second prescribed vehicle speed V2, the reference vehicle body roll angle θb_base is determined variably in accordance with the steering angle δ_act of the front wheel 4, as shown in FIG. 9A or 9B by way of example.

In FIG. 9A, the reference vehicle body roll angle θb_base when the steering angle δ of the front wheel 4 takes a certain positive value δx is shown by a broken line graph. In FIG. 9B, the reference vehicle body roll angle θb_base when the steering angle δ of the front wheel 4 takes a certain negative value −δx is shown by a broken line graph.

It should be noted that the above-described second prescribed vehicle speed V2 may take a value which is the same as, or different from, that of the aforesaid first prescribed vehicle speed V1 shown in FIGS. 5A, 5B, and 5C.

As shown in the figure, in the present embodiment, when the steering angle δ_act of the front wheel 4 takes a positive value (when the front wheel 4 is steered to the right) in the state where the vehicle speed V_act is lower than the second prescribed vehicle speed V2 (including the stopped state where V_act=0), the reference vehicle body roll angle θb_base is determined to be a positive value θb(δx), i.e. an inclination angle by which the vehicle body 3 is inclined to the same (here, right) side as the steered direction of the front wheel 4.

Further, when the steering angle δ_act of the front wheel 4 takes a negative value (when the front wheel 4 is steered to the left) in the state where the vehicle speed V_act is lower than the second prescribed vehicle speed V2, the reference vehicle body roll angle θb_base is determined to be a negative value θb(−δx), i.e. an inclination angle by which the vehicle body 3 is inclined to the same (here, left) side as the steered direction of the front wheel 4.

The magnitude of the reference vehicle body roll angle θb_base in the state where the vehicle speed V_act is lower than the second prescribed vehicle speed V2 is determined to become larger as the magnitude of the steering angle δ_act of the front wheel 4 is larger.

It should be noted that in the state where the vehicle speed V_act is not lower than the second prescribed vehicle speed V2, the reference vehicle body roll angle θb_base is determined to be a value of the vehicle body roll angle θb at which the centrifugal force moment and the gravitational force moment are balanced (where the resultant moment of the centrifugal force moment and the gravitational force moment becomes zero or almost zero).

The present embodiment is identical to the first embodiment except for the above-described matters.

According to the present embodiment, the following effects can be achieved. At the time of starting a mobile vehicle 1, when an operator of the mobile vehicle 1 wishes to turn the mobile vehicle 1 to the right or left immediately after it has started, it is often the case that the operator steers the front wheel 4 to the same side as the direction in which he/she wishes to turn the mobile vehicle 1, before starting the mobile vehicle 1.

In this case, as the reference vehicle body roll angle θb_base in the state where the vehicle speed V_act is lower than the second prescribed vehicle speed V2 is determined in the above-described manner, it is possible for the operator of the mobile vehicle 1 to smoothly incline the vehicle body 3 to the same side as the turning direction when making a turn immediately after the starting of the mobile vehicle 1.

It should be noted that the configuration of determining the reference vehicle body roll angle θb_base in the state where the vehicle speed V_act is lower than the second prescribed vehicle speed V2 in accordance with the steering angle δ_act of the front wheel 4 in the above-described manner may be applied to the aforesaid second embodiment.

[Modifications]

Several modifications to the embodiments described above will now be described.

In each of the aforesaid embodiments, the desired roll driving moment Md_cmd is determined such that the sensitivity of the change in desired roll driving moment Md_cmd to the change in vehicle body roll angle θb (in other words, the value obtained by partially differentiating Md_cmd by θb) changes discontinuously inside and outside the acceptable vehicle body roll angle area, as shown in FIGS. 6A and 6B by way of example.

Alternatively, it is possible to adopt a configuration where the desired roll driving moment Md_cmd is determined such that the above-described sensitivity changes continuously, for example, around each of the upper limit lim_R and the lower limit lim_L of the acceptable vehicle body roll angle area.

Figure 10A:
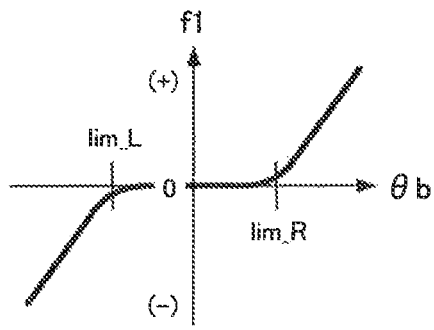
FIGS. 10A, 10B, and 10C are graphs illustrating modifications.
Figure 10B:
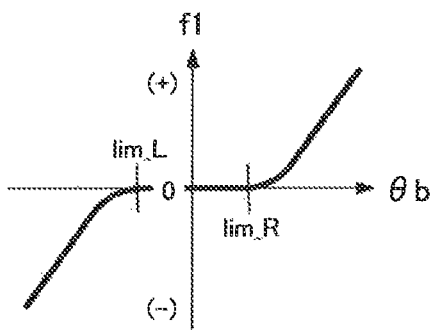
Figure 10C:
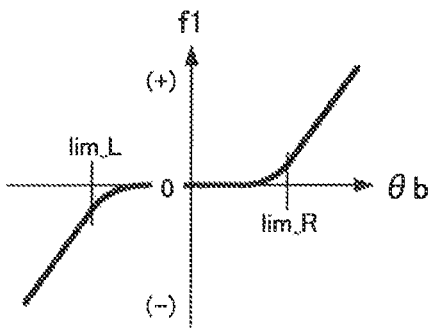

For example, in the processing of obtaining the first component Md1_1 of the aforesaid roll driving major-component moment Md1 (in the processing in the processing section 83a), the aforesaid deviation state quantity f1 is determined in accordance with the vehicle body roll angle θb, as shown by the graph in FIG. 10A, 10B, or 10C by way of example.

In this case, in the example shown in FIG. 10A, 10B, or 10C, the deviation state quantity f1 is determined such that the sensitivity of the change in f1 to the change in θb changes continuously around each of the upper limit lim_R and the lower limit lim_L of the acceptable vehicle body roll angle area.

In FIG. 10A, the upper limit lim_R and the lower limit lim_L of the acceptable vehicle body roll angle area are each set to an intermediate value within the range of θb in which the sensitivity of the change in f1 to the change in θb is changing. In FIG. 10B, the upper limit lim_R and the lower limit lim_L of the acceptable vehicle body roll angle area are each set such that the sensitivity of the change in f1 to the change in θb becomes a constant value (here, zero) within that area. Further, in FIG. 10C, the upper limit lim_R and the lower limit lim_L of the acceptable vehicle body roll angle area are each set such that the sensitivity of the change in f1 to the change in θb becomes a constant value outside that area.

Determining the deviation state quantity f1 in accordance with the vehicle body roll angle θb as described above makes it possible to cause the sensitivity of the change in desired roll driving moment Md_cmd to the change in vehicle body roll angle θb to change continuously.

Further, in each of the aforesaid embodiments, the desired roll driving moment Md_cmd is determined by combining the roll driving major-component moment Md1 and the roll driving sub-component moment Md2. Alternatively, for example, the roll driving major-component moment Md1 as it is may be determined to be the desired roll driving moment Md_cmd.

In this case, the processing in the reference vehicle body roll angle determining section 82, the processing in the second roll driving moment calculating section 84, and the processing in the moment combining section 85 become unnecessary.

Further, in each of the aforesaid embodiments, the second component Md1_2 of the roll driving major-component moment Md1 may be determined such that not only the first component Md1_1 of the roll driving major-component moment Md1, but also the second component Md1_2 become zero in the case where the vehicle body roll angle θb_act falls within the acceptable vehicle body roll angle area. In other words, the roll driving major-component moment Md1 may be determined such that the roll driving major-component moment Md1 is constantly zero in the case where the vehicle body roll angle θb_act falls within the acceptable vehicle body roll angle area.

Further, in each of the aforesaid embodiments, the roll driving major-component moment Md1 and the roll driving sub-component moment Md2 are determined as those corresponding to the first manipulated variable and the second manipulated variable of the present invention. Alternatively, other types of control manipulated variables, including a desired value of the driving force of the actuator such as the electric motor 33 of the roll driving mechanism 23, may be determined as the first manipulated variable and the second manipulated variable.

Further, in each of the embodiments described above, the mobile vehicle having one front wheel 4 and two rear wheels 5, 5 has been described by way of example. The mobile vehicle of the present invention, however, may be a mobile vehicle which has two wheels, spaced apart from each other in the lateral direction, for both of the front wheels and the rear wheels, or may be a mobile vehicle which has two front wheels and one rear wheel.

What is claimed is:

1. A mobile vehicle including
a vehicle body having a boarding section for an operator and inclinable in a roll direction with respect to a road surface,
two wheels disposed spaced apart from each other in a lateral direction on at least one of a front side and a rear side of the vehicle body, and
a roll driving mechanism having an actuator and causing a roll driving moment as a road surface reaction force moment in the roll direction to act on the vehicle body in accordance with a driving force output by the actuator,
the mobile vehicle having a characteristic that, while traveling, a turning behavior changes in accordance with a shift in the lateral direction of a body weight of the operator seated on the boarding section, and having a characteristic that, while being stopped, in the case where the vehicle body is inclined in the roll direction in a state where the roll driving moment acted on the vehicle body by the roll driving mechanism is zero, the inclination of the vehicle body further increases by a gravitational force moment which is a moment in the roll direction acting on the vehicle body because of gravitational force,
the mobile vehicle comprising a control device which controls the actuator of the roll driving mechanism in such a way as to change the roll driving moment at least in accordance with an observed value of a vehicle body roll angle which is an inclination angle in the roll direction of the vehicle body, wherein
the control device is configured to control the actuator of the roll driving mechanism such that, at least in a case where an actual vehicle speed of the mobile vehicle is higher than a first prescribed vehicle speed, function characteristics of the roll driving moment implemented by the control of the actuator of the roll driving mechanism by the control device with respect to the vehicle body roll angle have following properties A, B, and C:
property A: a magnitude of roll driving moment sensitivity defined by the function characteristics can be classified as large and small, the magnitude of the roll driving moment sensitivity becomes small in a first vehicle body roll angle area which is one range of the vehicle body roll angle, and the magnitude of the roll driving moment sensitivity becomes large in a second vehicle body roll angle area which is a range of the vehicle body roll angle larger than an upper limit of the first vehicle body roll angle area and in a third vehicle body roll angle area which is a range of the vehicle body roll angle smaller than a lower limit of the first vehicle body roll angle area;
property B: the roll driving moment in each of the second and third vehicle body roll angle areas is a moment in a direction of causing the observed value of the vehicle body roll angle to approach within the first vehicle body roll angle area; and
property C: the magnitude of the roll driving moment sensitivity in the first vehicle body roll angle area is smaller than a magnitude of gravitational force moment sensitivity, and the magnitude of the roll driving moment sensitivity in each of the second and third vehicle body roll angle areas is larger than the magnitude of the gravitational force moment sensitivity.

2. The mobile vehicle according to claim 1, wherein the control device is configured to control the actuator of the roll driving mechanism such that, at least in the case where the actual vehicle speed of the mobile vehicle is higher than the first prescribed vehicle speed, the function characteristics further have following property D:
property D: the roll driving moment changes monotonically with respect to the vehicle body roll angle.

3. The mobile vehicle according to claim 1, wherein the control device is configured to control the actuator of the roll driving mechanism in accordance with an observed value of the vehicle body roll angle and an observed value of the vehicle speed such that a width of the first vehicle body roll angle area in the function characteristics becomes narrower as the vehicle speed of the mobile vehicle is lower.

4. The mobile vehicle according to claim 3, wherein the control device is configured to control the actuator of the roll driving mechanism such that, in a state where the observed value of the vehicle speed of the mobile vehicle is not higher than the first prescribed vehicle speed, the upper limit and the lower limit of the first vehicle body roll angle area take an identical value, that a range of the vehicle body roll angle larger than the identical value and a range of the vehicle body roll angle smaller than the identical value become the second and third vehicle body roll angle areas, respectively, and that the function characteristics have the properties B and C related to the second and third vehicle body roll angle areas.

5. The mobile vehicle according to claim 1, wherein the control device is configured to control the actuator of the roll driving mechanism in accordance with an observed value of the vehicle body roll angle and an observed value of a steering angle from a neutral state of a steered wheel included in the mobile vehicle such that, at least in the case where the actual vehicle speed of the mobile vehicle is higher than the first prescribed vehicle speed, a center value of the first vehicle body roll angle area becomes zero when the mobile vehicle is traveling straight ahead and, when the mobile vehicle is making a turn, the center value of the first vehicle body roll angle area becomes a value of the vehicle body roll angle in a state where the vehicle body is inclined to the same side as a turning direction of the mobile vehicle and a magnitude of the center value of the first vehicle body roll angle area becomes larger as a magnitude of the steering angle from the neutral state of the steered wheel is larger.

6. The mobile vehicle according to claim 1, wherein the control device is configured to control the actuator of the roll driving mechanism in accordance with an observed value of the vehicle body roll angle and an observed value of a yaw rate of the mobile vehicle such that, at least in the case where the actual vehicle speed of the mobile vehicle is higher than the first prescribed vehicle speed, a center value of the first vehicle body roll angle area becomes zero when the mobile vehicle is traveling straight ahead and, when the mobile vehicle is making a turn, the center value of the first vehicle body roll angle area becomes a value of the vehicle body roll angle in a state where the vehicle body is inclined to the same side as a turning direction of the mobile vehicle and a magnitude of the center value of the first vehicle body roll angle area becomes larger as a magnitude of the yaw rate of the mobile vehicle is larger.

7. The mobile vehicle according to claim 5, wherein the control device is configured to control the actuator of the roll driving mechanism such that, at least at the time when the mobile vehicle is making a turn in the state where the actual vehicle speed of the mobile vehicle is higher than the first prescribed vehicle speed, one of a limit value of the upper limit and the lower limit of the first vehicle body roll angle area that is on the same side as the turning direction of the mobile vehicle becomes a value closer to a reference vehicle body roll angle as compared with a limit value on a side opposite to the turning direction.

8. The mobile vehicle according to claim 6, wherein the control device is configured to control the actuator of the roll driving mechanism such that, at least at the time when the mobile vehicle is making a turn in the state where the actual vehicle speed of the mobile vehicle is higher than the first prescribed vehicle speed, one of a limit value of the upper limit and the lower limit of the first vehicle body roll angle area that is on the same side as the turning direction of the mobile vehicle becomes a value closer to a reference vehicle body roll angle as compared with a limit value on a side opposite to the turning direction.

9. The mobile vehicle according to claim 1, wherein the control device is configured to control the actuator of the roll driving mechanism in accordance with a deviation of an observed value of the vehicle body roll angle from a reference vehicle body roll angle such that, at least in a case where the actual vehicle speed of the mobile vehicle is higher than a second prescribed vehicle speed, in a situation where the observed value of the vehicle body roll angle takes a value within the first vehicle body roll angle area, the observed value of the vehicle body roll angle approaches the reference vehicle body roll angle.

10. The mobile vehicle according to claim 9, wherein the control device is configured to
set the reference vehicle body roll angle in accordance with an observed value of a steering angle from a neutral state of a steered wheel included in the mobile vehicle such that, in a case where the actual vehicle speed of the mobile vehicle is not higher than the second prescribed vehicle speed, the reference vehicle body roll angle becomes a value of the vehicle body roll angle to the same side as the steering angle of the steered wheel from the neutral state, and
control the actuator of the roll driving mechanism in accordance with the deviation of the observed value of the vehicle body roll angle from the reference vehicle body roll angle in such a way as to cause the observed value of the vehicle body roll angle to approach the reference vehicle body roll angle.

11. The mobile vehicle according to claim 1, wherein the control device includes
a vehicle body roll angle area setting section which sets the first vehicle body roll angle area,
a vehicle body roll angle deviation state quantity calculating section which calculates a deviation state quantity indicating a deviation state of the observed value of the vehicle body roll angle from the set first vehicle body roll angle area, and
a first manipulated variable determining section which determines a first manipulated variable, which is a manipulated variable for controlling the actuator of the roll driving mechanism to generate the roll driving moment for reducing the deviation of the observed value of the vehicle body roll angle, in accordance with the calculated deviation state quantity, or in accordance with the calculated deviation state quantity and an observed value of a vehicle body roll angular velocity, which is a temporal change rate of the vehicle body roll angle, and
the control device is configured to control the actuator of the roll driving mechanism at least in accordance with the determined first manipulated variable.

12. The mobile vehicle according to claim 9, wherein the control device includes
a vehicle body roll angle area setting section which sets the first vehicle body roll angle area,
a vehicle body roll angle deviation state quantity calculating section which calculates a deviation state quantity indicating a deviation state of the observed value of the vehicle body roll angle from the set first vehicle body roll angle area,
a first manipulated variable determining section which determines a first manipulated variable, which is a manipulated variable for controlling the actuator of the roll driving mechanism to generate the roll driving moment for reducing the deviation of the observed value of the vehicle body roll angle, in accordance with the calculated deviation state quantity, or in accordance with the calculated deviation state quantity and an observed value of a vehicle body roll angular velocity, which is a temporal change rate of the vehicle body roll angle,
a reference vehicle body roll angle setting section which sets the reference vehicle body roll angle, and
a second manipulated variable determining section which determines a second manipulated variable, which is a manipulated variable for controlling the actuator of the roll driving mechanism to generate the roll driving moment for causing the deviation of the observed value of the vehicle body roll angle from the set reference vehicle body roll angle to approach zero, at least in accordance with the deviation, and
the control device is configured to control the actuator of the roll driving mechanism at least in accordance with a combined value of the determined first and second manipulated variables.

13. The mobile vehicle according to claim 11, wherein the first manipulated variable determining section is configured to
determine the first manipulated variable in accordance with the calculated deviation state quantity and an observed value of the vehicle body roll angular velocity, and
in a case where the observed value of the vehicle body roll angle falls within the set first vehicle body roll angle area and takes a value close to an upper limit or a lower limit of the first vehicle body roll angle area, determine the first manipulated variable in accordance with the observed value of the vehicle body roll angular velocity in such a way as to cause the vehicle body roll angular velocity to approach zero.

14. The mobile vehicle according to claim 12, wherein the first manipulated variable determining section is configured to
determine the first manipulated variable in accordance with the calculated deviation state quantity and an observed value of the vehicle body roll angular velocity, and
in a case where the observed value of the vehicle body roll angle falls within the set first vehicle body roll angle area and takes a value close to an upper limit or a lower limit of the first vehicle body roll angle area, determine the first manipulated variable in accordance with the observed value of the vehicle body roll angular velocity in such a way as to cause the vehicle body roll angular velocity to approach zero.

\* \* \* \* \*